(12) United States Patent
Wang et al.

(10) Patent No.: US 12,469,893 B2
(45) Date of Patent: Nov. 11, 2025

(54) IN-SITU GAS DETECTION AND MONITORING OF BATTERY CELLS DURING FORMATION AND INTENDED USE

(71) Applicant: GM GLOBAL TECHNOLOGY OPERATIONS LLC, Detroit, MI (US)

(72) Inventors: Lei Wang, Rochester Hills, MI (US); Anil Bika, Rochester Hills, MI (US); Gongshin Qi, Troy, MI (US); Michelle H Wiebenga, Farmington Hills, MI (US); Andrew J. Galant, Shelby Township, MI (US); William Osad, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 852 days.

(21) Appl. No.: 17/522,553

(22) Filed: Nov. 9, 2021

(65) Prior Publication Data

US 2023/0142289 A1    May 11, 2023

(51) Int. Cl.
*H01M 10/48* (2006.01)
*G01R 31/367* (2019.01)
*G01R 31/392* (2019.01)

(52) U.S. Cl.
CPC ........ *H01M 10/486* (2013.01); *G01R 31/367* (2019.01); *G01R 31/392* (2019.01)

(58) Field of Classification Search
CPC .......... H01M 10/486; H01M 10/4257; H01M 2010/4278; H01M 10/0525; H01M 10/4228; H01M 10/441; H01M 10/446; H01M 2010/4271; H01M 10/425; H01M 10/4285; H01M 10/48; H01M 10/482; H01M 10/52; H01M 50/30; G01R 31/367; G01R 31/392
See application file for complete search history.

(56) References Cited

U.S. PATENT DOCUMENTS

| 2015/0226810 A1* | 8/2015 | Elian | G01R 31/396 |
| | | | 324/426 |
| 2018/0356382 A1* | 12/2018 | Chen | G08B 29/14 |
| 2019/0103750 A1* | 4/2019 | Kristensen | H01M 10/441 |
| 2022/0077515 A1* | 3/2022 | Leyvi | H01M 50/204 |

FOREIGN PATENT DOCUMENTS

| EP | 3435443 B1 * | 9/2019 | ........ H01M 10/0463 |
| WO | WO-2020120780 A1 * | 6/2020 | .......... H01M 10/425 |

* cited by examiner

*Primary Examiner* — Adam A Arciero

(57) ABSTRACT

A battery cell monitoring system includes: a battery cell including an electrode stack disposed within a case; a gas sensor disposed within, attached to or connected to the case and configured to detect levels of one or more gases within the case; and a gas monitoring circuit connected to the gas sensor. The gas monitoring circuit includes: a memory that stores data collected from the gas sensor; a transceiver configured to transfer the data to a network device separate from the battery cell; and a control module that monitors the levels of one or more gases and based on the levels of the one or more gases detects (i) an issue with the battery cell during operative use of the battery cell, (ii) an issue with the battery cell during formation of the battery cell, or (iii) completion of a formation operation of the battery cell.

13 Claims, 20 Drawing Sheets

IN-SITU GAS DETECTION AND MONITORING OF BATTERY CELLS DURING FORMATION AND INTENDED USE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery cell monitoring and/or management systems for battery cells used in vehicles.

Advanced energy storage devices and systems are in demand to satisfy energy and/or power requirements for a variety of products, including automotive and non-automotive products such as start-stop systems (e.g., 12V start-stop systems), battery-assisted systems, hybrid electric vehicles ("HEVs"), electric vehicles ("EVs"), network devices, portable electronic devices, electric bikes, power storage devices, etc. These products include batteries, such as lithium-ion batteries and/or other batteries.

SUMMARY

A battery cell monitoring system is provided and includes: a battery cell including an electrode stack disposed within a case; one or more gas sensors disposed within, attached to or connected to the case and configured to detect levels of one or more gases within the case; and a gas monitoring circuit connected to the one or more gas sensors. The gas monitoring circuit includes: a memory configured to store data collected from the one or more gas sensors; a transceiver configured to transfer the data to a network device separate from the battery cell; and a control module configured to monitor the levels of one or more gases and based on the levels of the one or more gases detect (i) an issue with the battery cell during operative use of the battery cell, (ii) an issue with the battery cell during formation of the battery cell, or (iii) completion of a formation operation of the battery cell.

In other features, the gas monitoring circuit is implemented within the case of the battery cell.

In other features, the transceiver is configured to wirelessly communicate with the network device.

In other features, the transceiver is configured to communicate with the network device via a wired connection.

In other features, the gas monitoring circuit is connected to the case via a capillary.

In other features, the gas monitoring circuit receives power via a connector and cable and not from the electrode stack.

In other features, the control module is configured to detect an issue with the battery cell based on the levels of one or more gases and isolate the battery cell from other battery cells within a battery pack.

In other features, the one or more gas sensors are attached to the case of the battery cell.

In other features, the one or more gas sensors includes gas sensors serially connected.

In other features, the one or more gas sensors include parallel connected gas sensors.

In other features, the one or more gas sensors include serially and parallel connected gas sensors.

In other features, the battery cell monitoring system further includes switches connected to the one or more gas sensors. The one or more gas sensors includes gas sensors. The control module is configured to control operation of the switches to activate selected ones of the gas sensors.

In other features, the control module is configured to: monitor a voltage of the battery cell; ion current levels of gases in the case of the battery cell, where the gases includes the one or more gases; and detect whether the battery cell is fully charged or has an issue based on the voltage and the ion current levels of the gases.

In other features, an active safety management system is provided and includes: the battery cell monitoring system of claim 1; and gas monitoring circuits connected respectively to cells including the battery cell. The control module is configured to monitor the gas monitoring circuits and detect an outlier cell of the cells and isolate the outlier cell.

In other features, a formation system is provided and includes: the battery cell monitoring system; a cycler configured to charge and discharge the battery cell; and a formation monitor configured to control the cycler during formation of the battery cell, communicate with the gas monitoring circuit, and based on the levels of one or more gases, detect an issue with the battery cell or completion of the formation operation of the battery cell.

In other features, a battery cell formation method is provided and includes: assembling a battery cell; charging the battery cell to a first predetermined voltage at a first current level; maintaining first predetermined voltage for a first predetermined period of time while allowing a current level of the battery cell to decay from the first current level to a second current level; performing a degassing operation while monitoring levels of one or more gases within the battery cell; and discarding the battery cell based on the levels of the one or more gases.

In other features, the battery cell formation method further includes: placing the battery cell in a fixture subsequent to assembling the battery cell; and applying pressure on the battery cell.

In other features, the battery cell formation method further includes performing a life capacity check including: charging battery cell to second predetermined voltage at the first current level; maintaining the second predetermined voltage until the current level of the battery cell decays to the second current level; permitting a voltage of the battery cell to drop from the second predetermined voltage to a third predetermined voltage; monitoring the levels of the one or more gases while performing the life capacity check; and discarding the battery cell based on the levels of the one or more gases detected during the life capacity check.

In other features, the battery cell formation method further includes performing a resistance check including: charging and discharging the battery cell for a predetermined number of cycles; during a last discharging of the battery cell and when a state-of-charge of the battery cell is at a predetermined level, applying a pulse to the battery cell and measure a direct current resistance of the battery cell; following the last discharging of the battery cell, charging the battery cell to the predetermined level; monitoring the levels of the one or more gases while performing the resistance check; and discarding the battery cell based on the levels of the one or more gases detected during the resistance check.

In other features, the battery cell formation method further includes performing an aging process including: heating the battery cell to a predetermined temperature; maintaining the battery cell at the predetermined temperature for a predetermined period; monitoring the levels of the one or more gases while the battery cell is at the predetermined temperature; measuring resistance and voltage of the battery cell at completion of the predetermined period; and based on the levels of the one or more gases, the resistance of the battery cell, and the voltage of the battery cell, discarding the battery cell.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
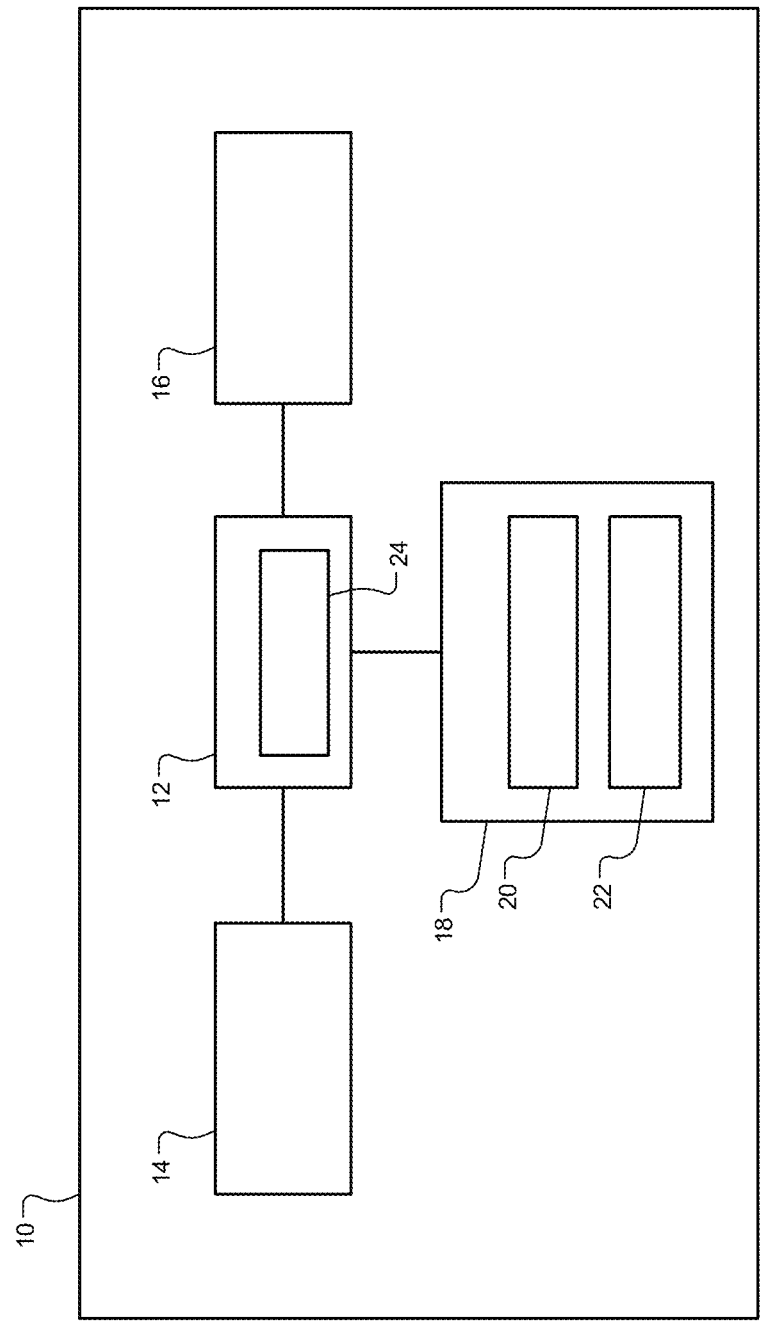
FIG. 1 is a functional block diagram of an example apparatus including power source gas monitoring circuits in accordance with the present disclosure.

All electric and hybrid vehicles can include large battery packs, which include hundreds to thousands of battery cells. As an example, a vehicle may include a MODACS that includes blocks (or strings of cells). A MODACS includes blocks (or strings) of cells. The cells may be connected in series or in parallel. The blocks of cells may also be connected in series or in parallel to provide various output voltages, such as 12V and 48V to power 12V loads and 48V loads. The blocks of cells may be grouped. Each group of blocks of cells may be referred to as a module (or battery module). A MODACS may have multiple battery modules. A MODACS may be implemented as a single battery having a corresponding housing with a negative (or ground reference) terminal and multiple source terminals. Each of the source terminals of a MODACS may have a preset direct current (DC) voltage (e.g., 12 volts (V), 24V, 36V, 48V, etc.) and may supply (or discharge) current or receive current during charging. As an example, the MODACS may include a single 48V source terminal, a first 12V source terminal and a second 12V source terminal. Other examples are provided below.

The MODACS may operate as a low-voltage high-power system. When a safety fault arises in the MODACS, such as a short circuit, or overcharging, a thermal runaway and/or propagation condition may occur. If an abnormal safety fault condition exists with a block of cells, the block of cells may be shutdown to prevent a thermal runaway propagation. When a block overheats, temperatures of adjacent blocks can increase, which can result in additional faults. Another abnormal safety condition that can require a shutdown is an overheat condition, which results in an abnormal heat signal being generated indicating a block of cells is overheating. Safety techniques include disconnecting a block of cells that is suspicious of having a fault from a power grid of the MODACS. The block of cells may then be removed and/or sent to a quality assessment facility to determine (i) whether an issue exists with the block of cells, and (ii) whether the block of cells is serviceable or needs to be replaced.

The examples set forth herein include active safety management systems (ASMSs), battery management systems (BMSs), and battery cell monitoring systems and circuits for monitoring gas levels within battery cells during formation of the battery cells and during intended use of the battery cells. During manufacturing of a battery pack, battery cells are assembled and run through multiple operations, tests and checks prior to being put in use. During this process and/or during intended use of the battery cells, gases (e.g., carbon monoxide (CO), carbon dioxide ($CO_2$), hydrogen ($H_2$), ethylene ($C_2H_4$), and/or methane ($CH_4$)) may be generated within the battery cells By monitoring the levels of the gases generated during formation, optimal formation time can be determined, or anomalous cells can be identified. By monitoring the levels of the gases generated during intended use, issues are able to be detected, such as errors in charging, overcharging events, over-discharging events, thermal runaway events, battery aging etc. This is described in further detail below.

The examples disclosed herein are applied to vehicle and non-vehicle implementations. The examples are applicable to internal combustion engine (ICE) vehicles, fully electric vehicles, battery electric vehicles (BEVs), hybrid electric vehicles including plug-in hybrid electric vehicles (PHEVs), partially or fully autonomous vehicles, and other types of vehicles including a MODACS for improved fuel economy and other advantages. The examples are also applicable to, for example, electric bikes, network devices, portable electronic devices (e.g., mobile phones, wearable devices, laptop computers, etc.), computers, stationary and mobile power storage devices, and various other devices.

The following FIGS. 1-6 show example systems, devices and vehicles in which the ASMSs, BMSs, and battery cell monitoring systems and circuits disclosed herein may be applied. The ASMSs, BMSs, and battery cell monitoring systems and circuits may be applied to other systems that utilize battery cells.

FIG. 1 shows an example apparatus 10 including power source gas monitoring circuits. The apparatus 10 may be a vehicle, a network device, a portable electronic device, a bike, or other apparatus. The apparatus 10 may include a control module 12, a memory 14, one or more loads 16 and a power source 18. The power source 18 may include one or more battery packs 20 and one or more gas monitoring circuits 22. The control module 12 may supply power from the power source 18 to the loads 16, as shown and/or may control transfer of power directly from the power source 18 to the loads 16. The control module 12 may include an ASM module 24, as further described below. The gas monitoring circuits 22 may be included in the battery packs 20 or may be separate from and monitor the battery packs 20. Various examples of battery packs, battery cells and gas monitoring circuits are shown and described below and are applicable to this embodiment. The loads 16 may include any electronic device drawing electrical current, such as lights, a display, an electronic and/or electrical circuit, a motor, a compressor, a pump, an actuator, etc.

Figure 2:
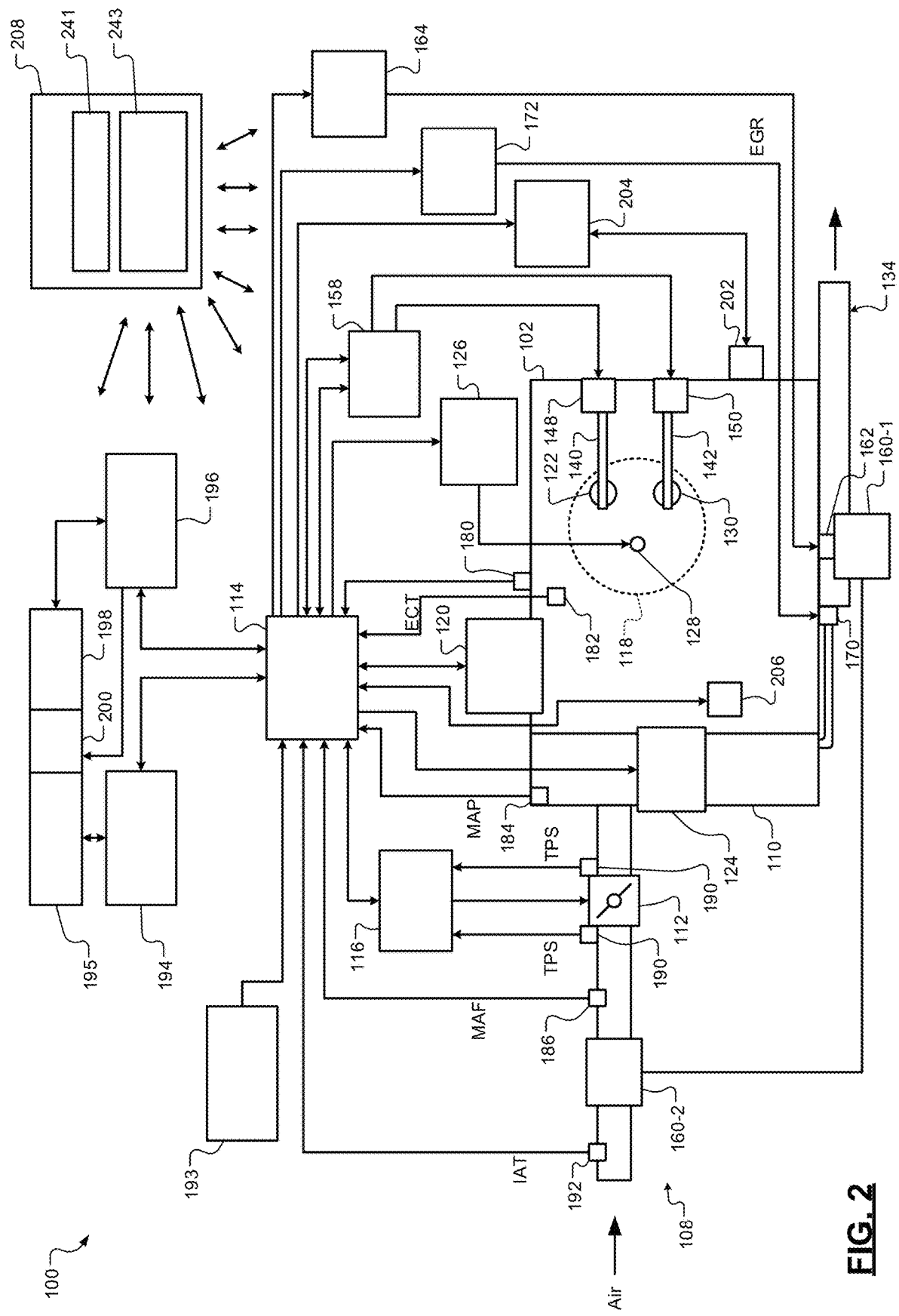
FIG. 2 is a is a functional block diagram of an example vehicle control system including a multiple output dynamic adjustable capacity battery system (MODACS) including an active safety management system (ASMS) and gas monitoring circuits in accordance with the present disclosure.

FIG. 2 shows an example powertrain system 100 of a vehicle that includes an engine 102. The vehicle may be non-autonomous, partially autonomous or fully autonomous. The engine 102 includes an intake system 108, an intake manifold 110 and a throttle valve 112. An engine (or vehicle) control module (ECM) 114 controls a throttle actuator module 116. The engine includes one or more cylinders 118, which may be selectively deactivated by the ECM 114 via a cylinder actuator module 120. The cylinder 118 has an intake valve 122. The ECM 114 controls a fuel actuator module 124, which regulates fuel injection to achieve a desired air/fuel ratio. The engine 102 may be a spark-ignition engine, in which case a spark actuator module 126 energizes a spark plug 128 in the cylinder 118 based on a signal from the ECM 114, which ignites the air/fuel mixture. The engine 102 may be a homogenous charge compression ignition (HCCI) engine, which performs both compression ignition and spark ignition, or other type of engine.

The engine 102 may further have an exhaust valve 130 and an exhaust system 134. The intake valve 122 may be controlled by an intake camshaft 140, while the exhaust valve 130 may be controlled by an exhaust camshaft 142. The engine 102 may further include an intake cam phaser 148 and an exhaust cam phaser 150. A phaser actuator module 158 may control the intake cam phaser 148 and the exhaust cam phaser 150.

The engine 102 may include a turbocharger turbine 160-1, a turbocharger compressor 160-2 a waste gate 162, and an exhaust gas recirculation (EGR) valve 170. The EGR valve 170 may be controlled by an EGR actuator module 172. The engine 102 may further include a crankshaft position sensor 180, an engine coolant temperature (ECT) sensor 182, a manifold absolute pressure (MAP) sensor 184, a mass air flow (MAF) sensor 186, one or more throttle position sensors (TPS) 190, an intake air temperature (IAT) sensor 192 and/or one or more other sensors 193.

The ECM 114 may communicate with a transmission control module 194, for example, to coordinate engine operation with gear shifts in a transmission 195. The ECM 114 may communicate with a hybrid control module 196, for example, to coordinate operation of the engine 102 and an electric motor 198. While the example of one electric motor is provided, multiple electric motors may be implemented. The electric motor 198 may be a permanent magnet electric motor or another suitable type of electric motor that outputs voltage based on back electromagnetic force (EMF) when free spinning, such as a direct current (DC) electric motor or a synchronous electric motor. In various implementations, various functions of the ECM 114, the transmission control module 194, and the hybrid control module 196 may be integrated into one or more modules. Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from a MODACS 208 to the electric motor 198 to cause the electric motor 198 to output positive torque. The MODACS 208 is further described below. The electric motor 198 may output torque, for example, to an input shaft of the transmission 195, to an output shaft of the transmission 195, or to another component. A clutch 200 may be implemented to couple the electric motor 198 to the transmission 195 and to decouple the electric motor 198 from the transmission 195. One or more gearing devices may be implemented between an output of the electric motor 198 and an input of the transmission 195 to provide one or more predetermined gear ratios between rotation of the electric motor 198 and rotation of the input of the transmission 195. In various implementations, the electric motor 198 may be omitted.

The ECM 114 starts the engine 102 via a starter motor 202. The ECM 114 or another suitable module of the vehicle engages the starter motor 202 with the engine 102 for an engine startup event. The ECM 114 may also start the engine in response to an auto-start command during an auto-stop/start event or to an engine start command for a sailing event. A starter actuator module 204 controls the starter motor actuator and the starter motor 202 based on signals from a starter control module, as discussed further below. In various implementations, the starter motor 202 may be maintained in engagement with the engine 102. The starter motor 202 draws power from the MODACS 208 to start the engine 102.

A generator 206 converts mechanical energy of the engine 102 into alternating current (AC) power. For example, the generator 206 may be coupled to the crankshaft (e.g., via gears or a belt) and convert mechanical energy of the engine 102 into AC power by applying a load to the crankshaft. The generator 206 rectifies the AC power into DC power and stores the DC power in the MODACS 208. Alternatively, a rectifier that is external to the generator 206 may be implemented to convert the AC power into DC power. The generator 206 may be, for example, an alternator. In various implementations, such as in the case of a belt alternator starter (BAS), the starter motor 202 and the generator 206 may be implemented together.

A MODACS control module 240 may be attached to, implemented in or be connected externally to the housing of the MODACS 208. Example MODACS and MODACS control modules are shown in FIGS. 3, 6-7 and 24. The MODACS control module 240 may be implemented partially or fully at the housing or at a remote location. As an example, the MODACS control module 240 may be implemented as a control module within a vehicle and/or as part of a vehicle control module.

Figure 23:
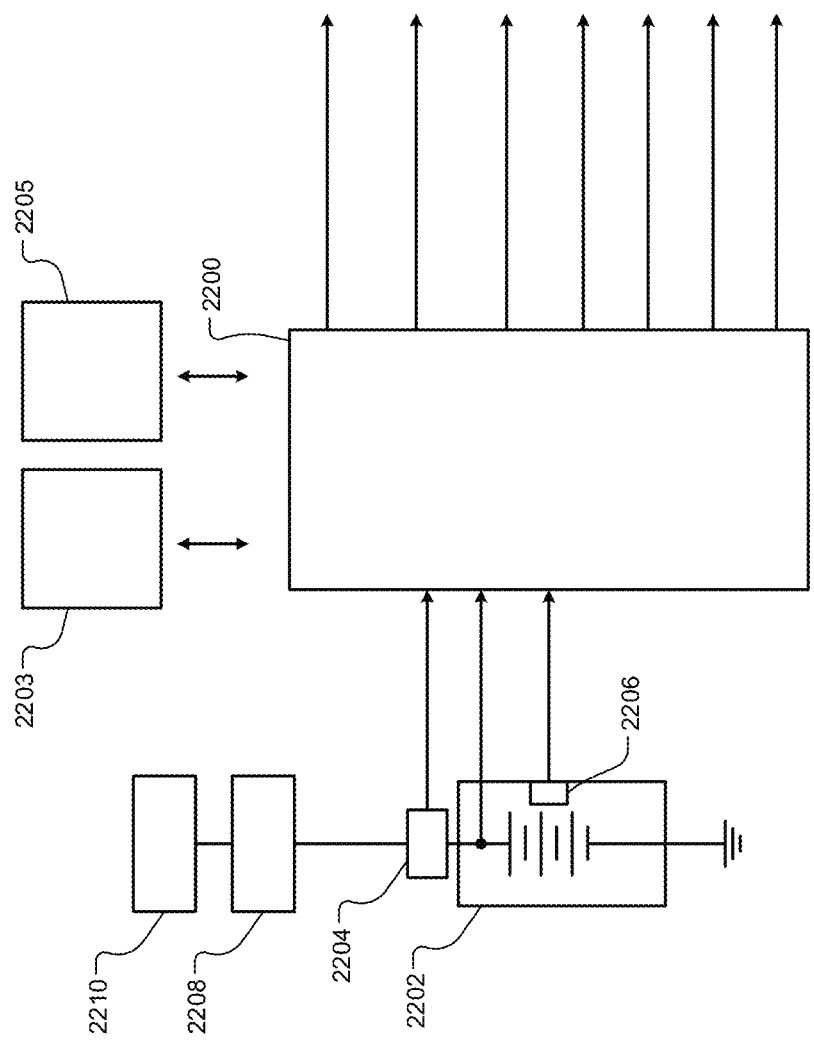
FIG. 23 is a functional block diagram of an example battery monitoring (or management) system (BMS) module for a battery pack in accordance with the present disclosure.
Figure 24:
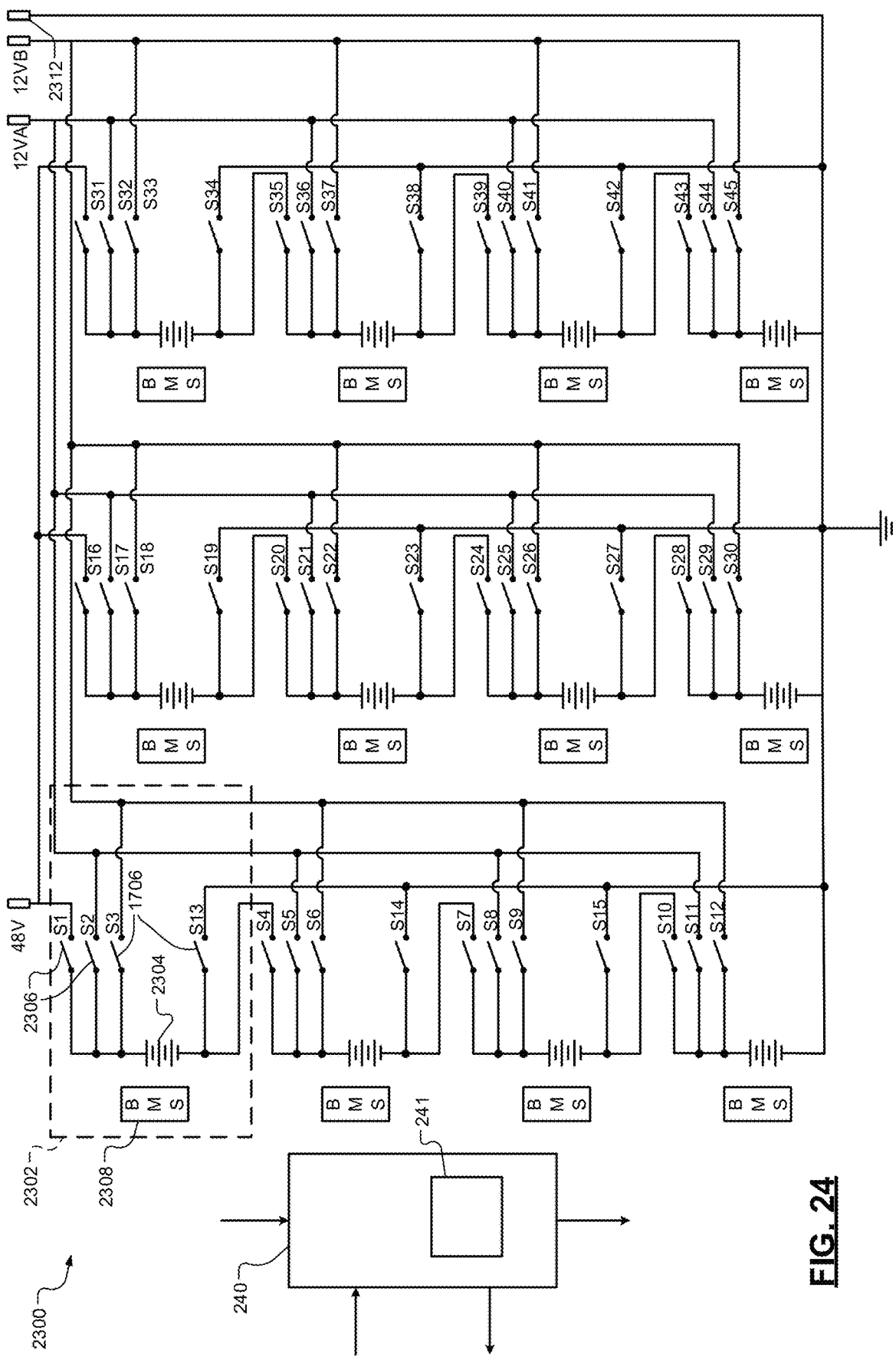
FIG. 24 is a schematic of an example portion of a MODACS circuit in accordance with the present disclosure.

The housing of the MODACS 208 may include gas monitoring circuits 243, switches and battery monitoring (or management) system (BMS) modules, examples of which are shown in FIGS. 23-24. Examples of the gas monitoring circuits 243 are shown in FIGS. 9-19. The switches and BMS modules may be connected to, implemented in, and/or implemented separate from the cells of the MODACS 208. The BMS modules may include gas monitoring circuits and/or sensors.

The MODACS control module 240 controls operating states of the switches to connect selected ones of the cells to the source terminals based on information from the BMS modules. Any number of the cells, blocks and/or battery modules may be selected and connected to each of the source terminals at any moment in time. The cells, blocks and battery modules may be connected: in series and/or in parallel; in different connected configurations; and may be organized into blocks, packs, and/or groups. Each block may include one or more cells, which may be connected in series and/or in parallel. Each pack may include one or more blocks, which may be connected in series and/or in parallel. Each group may include one or more packs, which may be connected in series and/or in parallel. The groups may be connected in series and/or in parallel. A battery module may refer to one or more packs and/or one or more groups.

Each of the BMS modules may be assigned to one or more cells, one or more blocks, one or more packs, and/or one or more groups and monitor corresponding parameters, such as voltages, temperatures, current levels, SOXs, instantaneous power and/or current limits, short-term power and/or current limits, continuous power and/or current limits, and/or gas levels of gases within the cells. Gas levels within individual cells, blocks, packs, and/or groups may be monitored.

The acronym "SOX" refers to a state of charge (SOC), a state of health (SOH), state of power (SOP), and/or a state of function (SOF). The SOC of a cell, pack and/or group may refer to the voltage, current and/or amount of available power stored in the cell, pack and/or group. The SOH of a cell, pack and/or group may refer to: the age (or operating hours); whether there is a short circuit; whether there is a loose wire or bad connection; temperatures, voltages, power levels, and/or current levels supplied to or sourced from the cell, pack and/or group during certain operating conditions; and/or other parameters describing the health of the cell, pack and/or group. The SOF of a cell, pack and/or group may refer to a current temperature, voltage, and/or current level supplied to or sourced from the cell, pack and/or group, and/or other parameters describing a current functional state of the cell, pack and/or group.

Instantaneous power and current limits may refer to power and current limits for a short period of time (e.g., less than 2 seconds). Short term power and current limits may refer to power and current limits for an intermediate length of time (e.g., 2-3 seconds). Continuous power and current limits refer to power and current limits for an extended period of time (e.g., periods greater than 3 seconds).

A MODACS control module 240 controls the states of the switches to connect the cells to the source terminals while satisfying target and/or requested voltages, currents and power capacities. The MODACS control module 240 and/or a vehicle control module may set the target and/or requested voltages, currents and power capacities, for example, based on a mode of operation. The MODACS 208 may operate in different operating modes, which correspond to vehicle operating modes, as described below. The MODACS operating modes may include, for example, a regenerative mode, a boost mode, an auto start mode, or other MODACS charge or discharge modes. The vehicle operating modes may include an electric vehicle launch mode, an engine start mode, an engine assist mode, an opportunity charging mode, a deceleration fuel cut-off (DFCO) regenerative mode, an electric vehicle regenerative mode (e.g., a generator DFCO regenerative mode or a brake regenerative mode), an electric vehicle cruise mode, and/or other vehicle operating mode. Additional vehicle operating modes are described below. Each of the vehicle operating modes corresponds to one of the MODACS modes. The stated modes are further described below.

Figure 3:
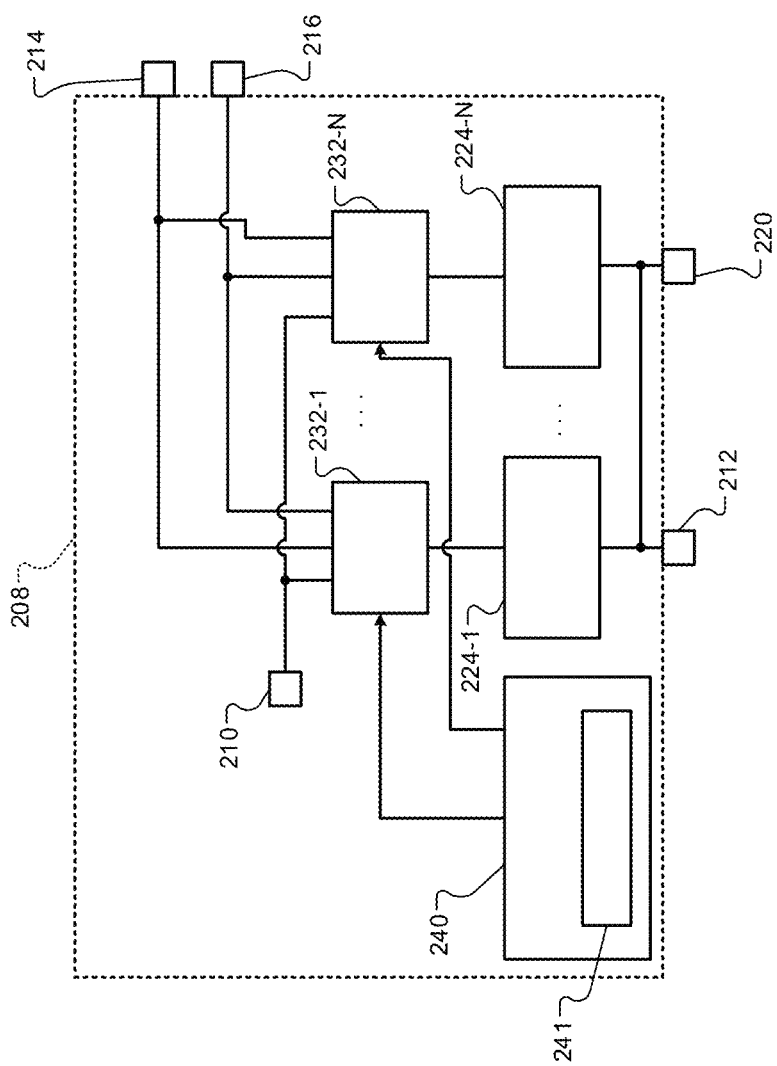
FIG. 3 is a functional block diagram of an example MODACS in accordance with the present disclosure.

FIG. 3 shows a MODACS 208 that may be implemented as a single battery having multiple source terminals. Three example source terminals 210, 214, 216 are shown, although any number of source terminals may be included. The source terminals, which may be referred to as positive output terminals, provide respective direct current (DC) operating voltages. The MODACS 208 may include only one negative terminal or may include a negative terminal for each source terminal. For example only, the MODACS 208 may have a first positive (e.g., 48 Volt (V)) terminal 210, a first negative terminal 212, a second positive (e.g., a first 12V) terminal 214, a third positive (e.g., a second 12V) terminal 216, and a second negative terminal 220. While the example of the MODACS 208 having a 48V operating voltage and two 12V operating voltages is provided, the MODACS 208 may have one or more other operating voltages, such as only two 12V operating voltages, only two 48V operating voltages, two 48V operating voltages and a 12V operating voltage, or a combination of two or more other suitable operating voltages. As another example, the operating voltages may range from 12V-144V.

The MODACS 208 includes cells and/or blocks of cells, such as a first block (or string) 224-1 to an N-th block (or string) 224-N ("blocks 224"), where N is an integer greater than or equal to 2. Each of the blocks 224 may include one or more cells. Each block may also be separately replaceable within the MODACS 208. For example only, each of the blocks 224 may be an individually housed 12V DC battery. The ability to individually replace the blocks 224 may enable the MODACS 208 to include a shorter warranty period and have a lower warranty cost. The blocks 224 are also individually isolatable, for example, in the event of a fault in a block. In various implementations, the MODACS 208 may have the form factor of a standard automotive grade 12V battery.

Each of the blocks 224 has its own separate capacity (e.g., in amp hours, Ah). The MODACS 208 includes switches, such as first switches 232-1 to 232-N (collectively "switches 232"). The switches 232 enable the blocks 224 to be connected in series, parallel, or combinations of series and parallel to provide desired output voltages and capacities at the output terminals. Although examples of some switches are shown, other switches may be included to perform the various operations disclosed herein.

A MODACS control module 240 includes an ASM module 241 and may control the switches 232 to provide desired output voltages and capacities at the source terminals. The MODACS control module 240 controls the switches 232 to vary the capacity provided at the source terminals based on a present operating mode of the vehicle, as discussed further below. The ASM module 241 may also control the stated switches 232 to disconnect, isolate, test and/or reconnect blocks of cells from the power grid, which includes the other blocks of cells, source terminals, negative terminals, etc. Operations of the ASM module 241 are further described below.

Figure 4A:
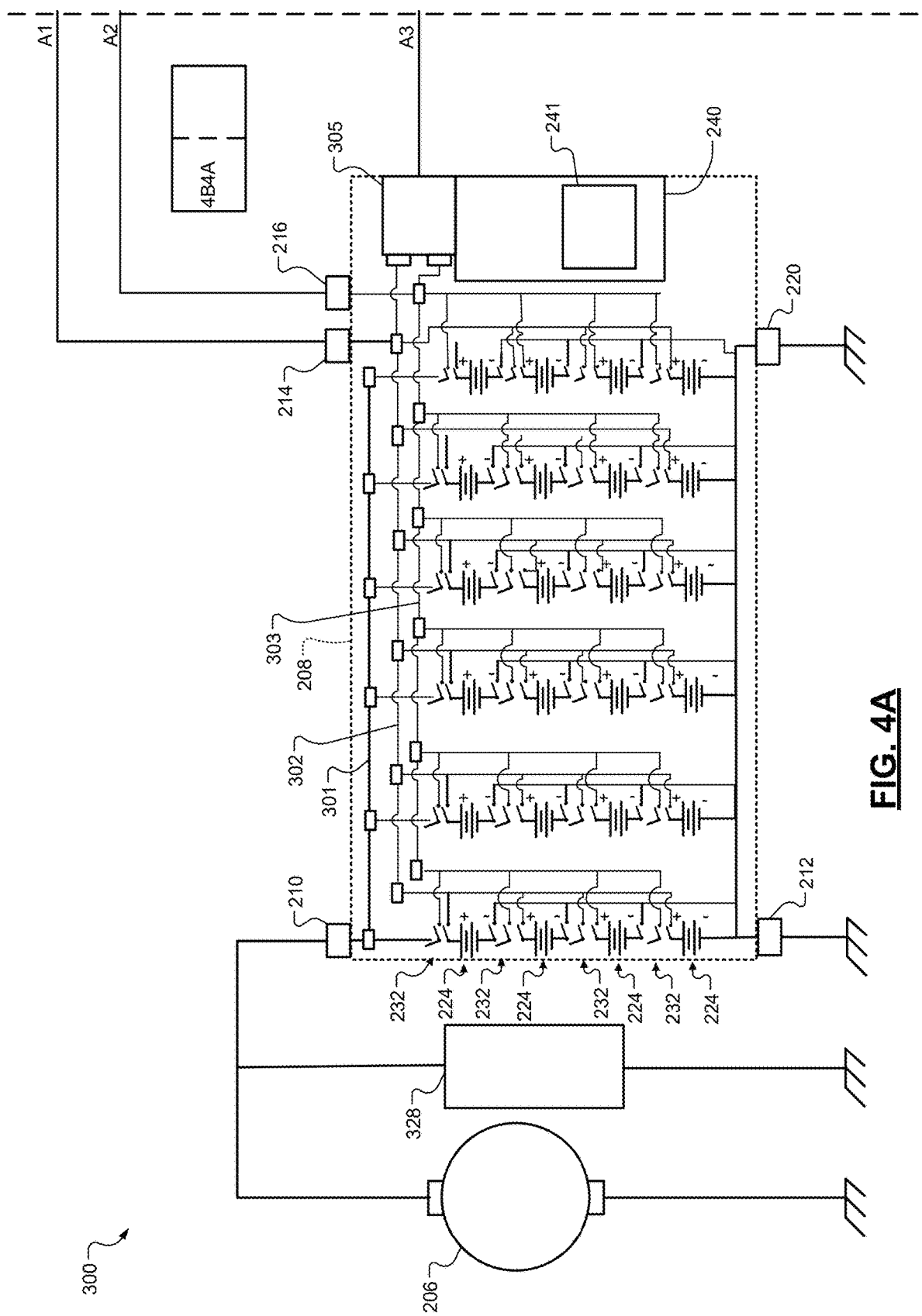
FIGS. 4A-4B are a schematic including an example implementation of a MODACS in accordance with the present disclosure.
Figure 4B:
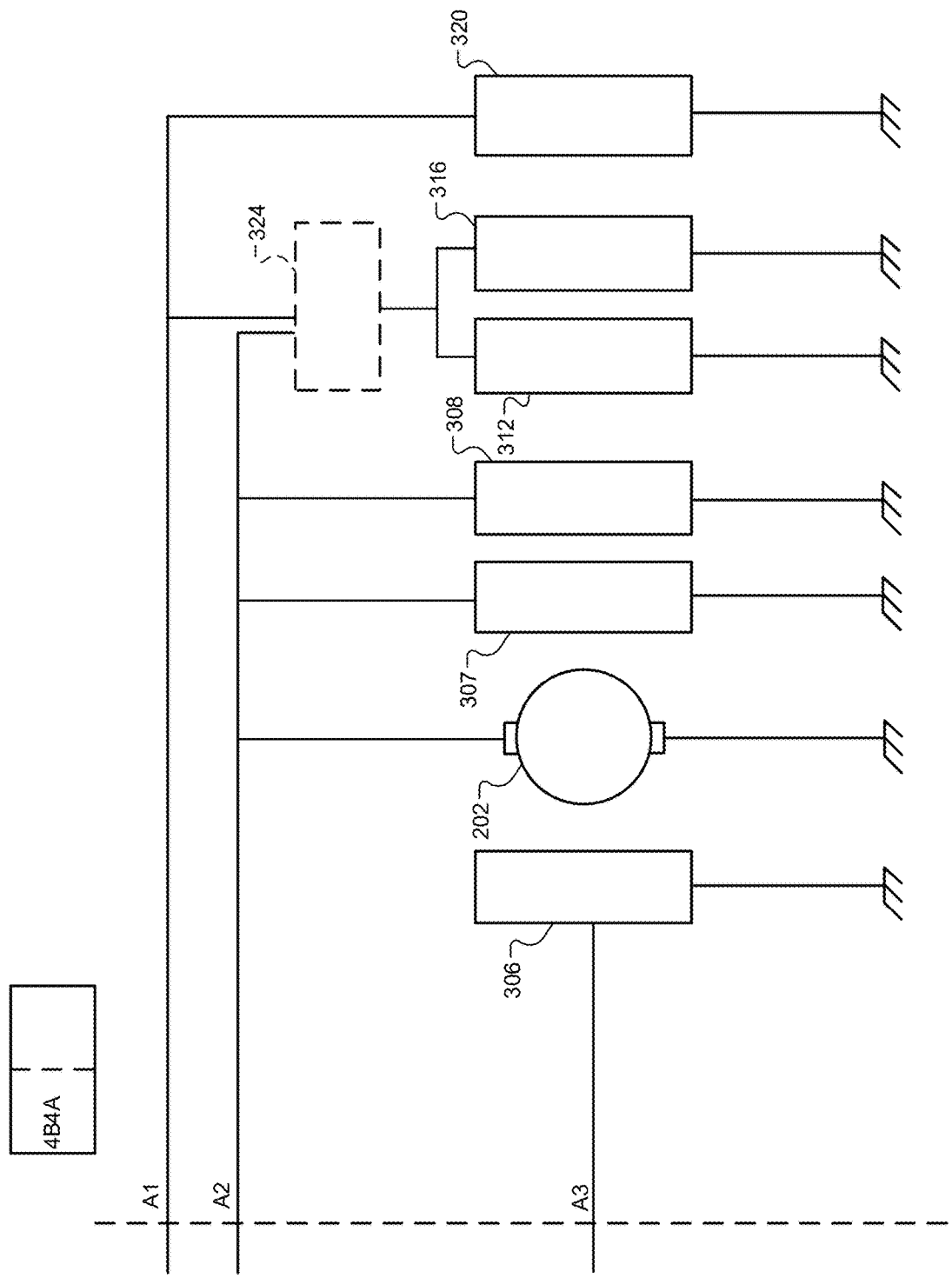

FIGS. 4A-4B show a vehicle electrical system 300 including an example implementation of the MODACS 208. The MODACS 208 includes the source terminals 210, 214, 216, respective power rails 301, 302, 303, a MODACS control module 240, and a power control circuit 305, which may be connected to the MODACS control module 240 and vehicle control module (VCM) and/or BCM 306. The VCM and/or BCM 306 may operate similar as, include and/or be implemented as the ECM 114 of FIG. 6. Power rail 303 may be a redundant power rail and/or used for different loads than the power rail 302. The MODACS control module 240 including the ASM module 241, the power control circuit 305, the VCM and/or the BCM 306 may communicate with each other via a controller area network (CAN), a local interconnect network (LIN), a serial network, wirelessly and/or another suitable network and/or interface. The MODACS control module 240 may communicate with the VCM and/or BCM 306 directly or indirectly via the power control circuit 305 as shown.

In the example of FIG. 4A, sets of 4 of the blocks 224 (e.g., 12V blocks) are connectable in series (via ones of the switches 232) to the first positive terminal 210 and the first negative terminal 212 to provide a first output voltage (e.g., 48V). Individual ones of the blocks 224 may be connected (via ones of the switches 232) to the second positive terminal 214 or the third positive terminal 216 and the second negative terminal 220 to provide a second output voltage (e.g., 12V) at the second and third positive terminals 214 and 216. How many of the blocks 224 are connected to the first positive terminal 210, the second positive terminal 214, and the third positive terminal 216 dictates the portions of the overall capacity of the MODACS 208 available at each of the positive terminals. Any number of the blocks may be connected in series and any number of series sets may be connected in parallel. In the example of FIG. 4A, the blocks 224 are shown with battery symbols. Each block may include, as an example, four cells, where each cell is connected in series and is a lithium ion cell (e.g., a lithium iron battery (LFP) cell with a nominal voltage at 3.2V).

As shown in FIG. 4B, a first set of vehicle electrical components operates using one of the two or more operating voltages of the MODACS 208. For example, the first set of vehicle electrical components may be connected to the second and third positive terminals 214 and 216. Some of the first set of vehicle electrical components may be connected to the second positive terminal 214, and some of the first set of vehicle electrical components may be connected to the third positive terminal 216. The first set of vehicle electrical components may include, for example but not limited to, the VCM and/or BCM 306 and other control modules of the vehicle, the starter motor 202, and/or other electrical loads, such as first 12V loads 307, second 12V loads 308, other control modules 312, third 12V loads 316, and fourth 12V loads 320. In various implementations, a switching device 324 may be connected to both of the first and second positive terminals 214. The switching device 324 may connect the other control modules 312 and the third 12V loads 316 to the second positive terminal 214 or the third positive terminal 216.

As shown in FIG. 4A, a second set of vehicle electrical components operates using another one of the two or more operating voltages of the MODACS 208. For example, the second set of vehicle electrical components may be connected to the first positive terminal 210. The second set of vehicle electrical components may include, for example but not limited to, the generator 206 and various electrical loads, such as 48V loads 328. The generator 206 may be controlled to recharge the MODACS 208.

Each of the switches 232 may be an insulated gate bipolar transistor (IGBT), a field effect transistor (FET), such as a metal oxide semiconductor FET (MOSFET), or another suitable type of switch.

Figure 5:
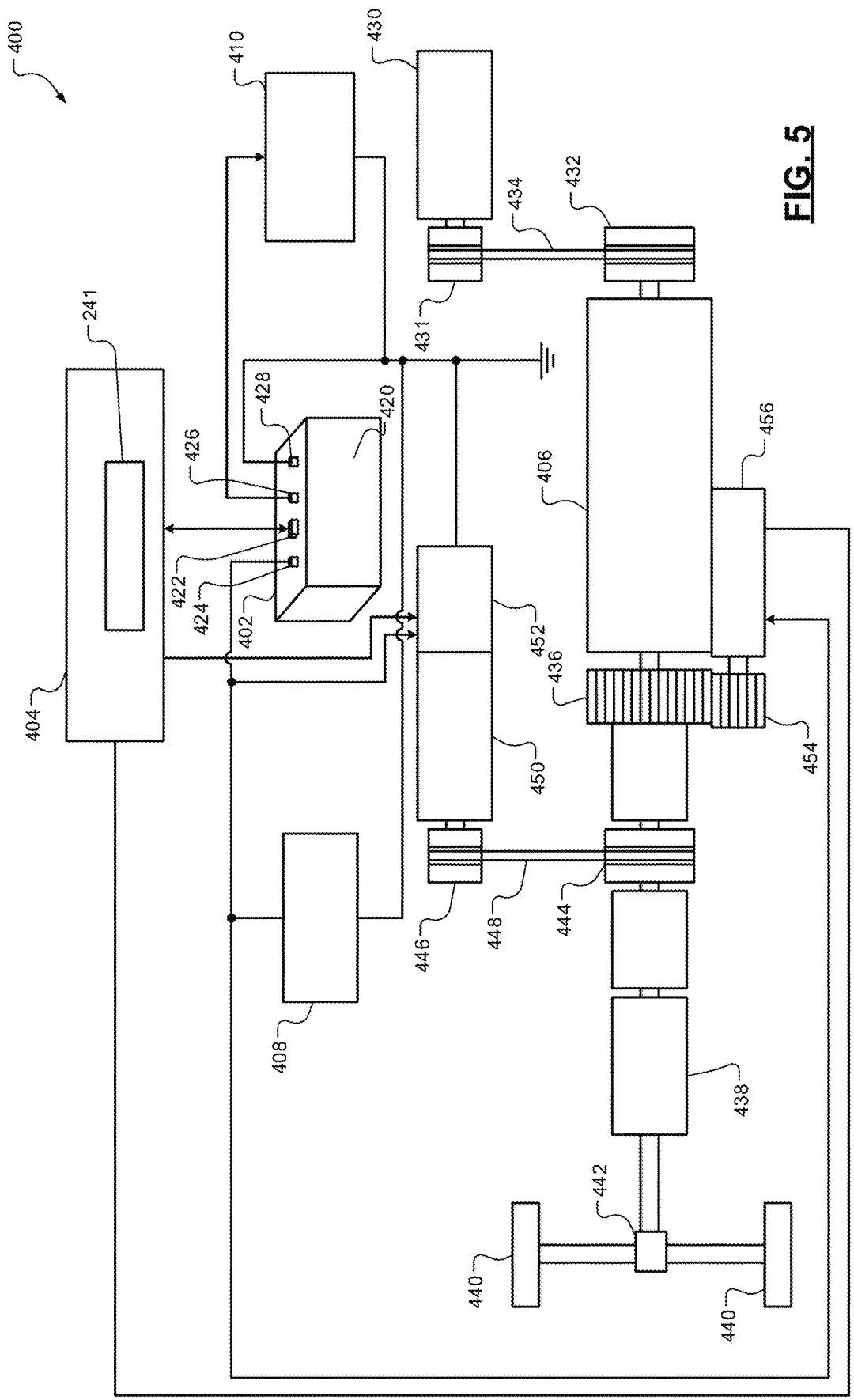
FIG. 5 is a functional block diagram of another example of a vehicle control system including a vehicle control module with an active safety management (ASM) module in accordance with the present disclosure.

FIG. 5 shows an example of another vehicle control system 400 that is applicable to the MODACSs disclosed herein. The vehicle control system 400 includes a MODACS 402, a vehicle control module 404, an internal combustion engine (ICE) 406, high-voltage loads 408, and low-voltage loads 410. The vehicle control module 404 may operate similarly as the other vehicle control modules referred to herein and may include the ASM module 241. The high-voltage loads 408 may include electric motors, compressors, and/or other high-voltage loads. The low-voltage loads may include lights, seat heaters, electric fans, audio system, video system, power window motors, power door lock motors, electronic circuits, etc. The MODACS 402 has a housing 420 and includes a MODACS control module 422, a first source terminal 424, a second source terminal 426 and a negative (or reference ground) terminal 428. The MODACS 402 may have any number of source terminals.

The ICE 406 may drive a water pump 430 via pulleys 431, 432 and belt 434. The ICE 406 may drive a main gear 436, which drives a clutches C1, C2 and a transmission 438 to drive wheels 440 via a differential 442. The first clutch C1 may be used to engage pulleys 444, 446 and belt 448, which drive a motor generator unit (MGU) 450. The second clutch C2 may be used to engage the transmission 438. An AC-to-DC converter 452 converts alternating current (AC) power from the MGU 450 to DC power, which is used to charge the cells of the MODACS 402. The main gear 436 may be turned by a second gear 454 via a starter 456 when cranking the ICE 406.

Figure 6:
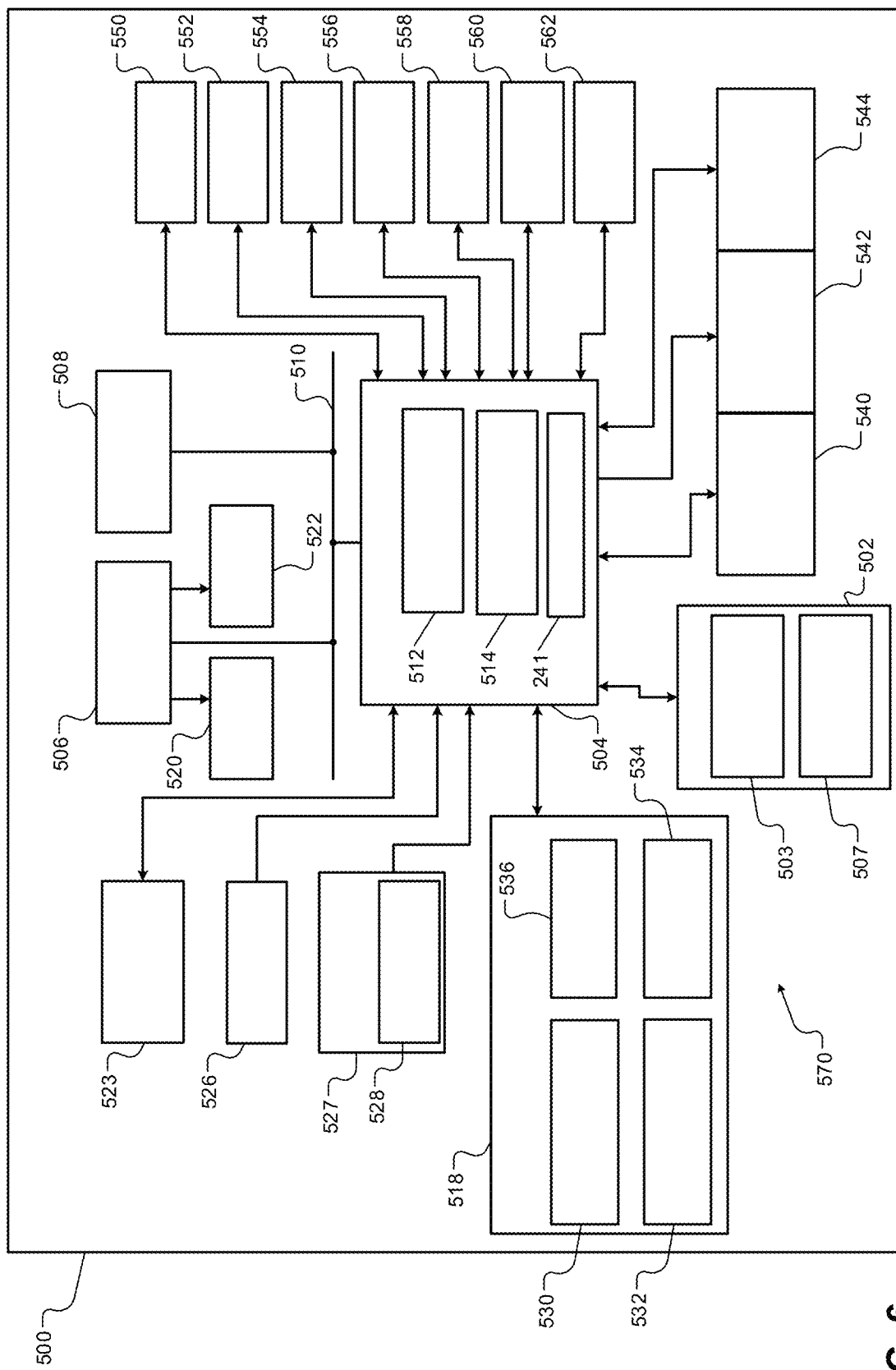
FIG. 6 is a functional block diagram of an example vehicle including MODACS gas monitoring circuits in accordance with the present disclosure.

FIG. 6 shows a vehicle 500 illustrating another example implementation of a MODACS, which may replace and/or operate similarly as the MODACS 208 and 402 of FIGS. 2-5. The vehicle 500 may include a MODACS 502 with a MODACS control module 503 and gas monitoring circuits 507, a vehicle control module 504, an infotainment module 506 and other control modules 508. The gas monitoring circuits 507 may be implemented as part of the MODACs 502 or separate from the MODACS 502. Various example implementations of the gas monitoring circuits 507 are described herein and are applicable to the embodiment of FIG. 6, as well as to at least the embodiments of FIGS. 1-5.

The modules 503, 504, 506, 508 may communicate with each other via one or more buses 510, such as a controller area network (CAN) bus and/or other suitable interfaces. The vehicle control module 504 may control operation of vehicles systems. The vehicle control module 504 may include a mode selection module 512, a parameter adjustment module 514, as well as other modules. The mode selection module 512 may select a vehicle operating mode, such as one of the vehicle operating modes stated above. The parameter adjustment module 514 may be used to adjust parameters of the vehicle 500.

The vehicle 500 may further include: a memory 518; a display 520; an audio system 522; one or more transceivers 523 including sensors 526; and a navigation system 527 including a global positioning system (GPS) receiver 528. The sensors 526 may include sensors, cameras, objection detection sensors, temperature sensors, accelerometers, vehicle velocity sensor, and/or other sensors. The GPS receiver 528 may provide vehicle velocity and/or direction (or heading) of the vehicle and/or global clock timing information.

The memory 518 may store sensor data 530 and/or vehicle parameters 532, MODACS parameters 534, and applications 536. The applications 536 may include applications executed by the modules 503, 504, 506, 508. Although the memory 518 and the vehicle control module 504 are shown as separate devices, the memory 518 and the vehicle control module 504 may be implemented as a single device.

The vehicle control module 504 may control operation of an engine 540, a converter/generator 542, a transmission 544, a window/door system 550, a lighting system 552, a seating system 554, a mirror system 556, a brake system 558, electric motors 560 and/or a steering system 562 according to parameters set by the modules 503, 504, 506, 508. The vehicle control module 504 may set some of the parameters based on signals received from the sensors 526. The vehicle control module 504 may receive power from the MODACS 502, which may be provided to the engine 540, the converter/generator 542, the transmission 544, the window/door system 550, the lighting system 552, the seating system 554, the mirror system 556, the brake system 558, the electric motors 560 and/or the steering system 562, etc. Some of the vehicle control operations may include unlocking doors of the window/door system 550, enabling fuel and spark of the engine 540, starting the electric motors 560, powering any of the systems 550, 552, 554, 556, 558, 562, and/or performing other operations as are further described herein.

The engine 540, the converter/generator 542, the transmission 544, the window/door system 550, the lighting system 552, the seating system 554, the mirror system 556, the brake system 558, the electric motors 560 and/or the steering system 562 may include actuators controlled by the vehicle control module 504 to, for example, adjust fuel, spark, air flow, steering wheel angle, throttle position, pedal position, door locks, window position, seat angles, etc. This control may be based on the outputs of the sensors 526, the navigation system 527, the GPS receiver 528 and the above-stated data and information stored in the memory 518.

The vehicle control module 504 may determine various parameters including a vehicle speed, an engine speed, an engine torque, a gear state, an accelerometer position, a brake pedal position, an amount of regenerative (charge) power, an amount of boost (discharge) power, an amount of auto start/stop discharge power, and/or other information, such as priority levels of source terminals of the MODACS 502, power, current and voltage demands for each source terminal, etc. The vehicle control module 504 may share this information and the vehicle operating mode with the MODACS control module 503. The MODACS control module 503 may determine other parameters, such as: an amount of charge power at each source terminal; an amount of discharge power at each source terminal; maximum and minimum voltages at source terminals; maximum and minimum voltages at power rails, cells, blocks, packs, and/or groups; SOX values cells, blocks, packs, and/or groups; temperatures of cells, blocks, packs, and/or groups; current values of cells, blocks, packs, and/or groups; power values cells, blocks, packs, and/or groups; etc. The MODACS control module 503 may determine connected configurations of the cells and corresponding switch states as described herein based on the parameters determined by the vehicle control module 504 and/or the MODACS control module 503.

The vehicle 500 includes an ASM system 570, which includes the ASM module 241, the MODACS 502, and the MODACS control module 503. Although shown in the vehicle control module 504, the ASM module 241 may be included in the MODACS control module 503. In one embodiment, the vehicle control module 504 and the MODACS control module 503 are implemented as a single control module.

The following examples of FIGS. 7-25C are applicable to all of the above-described examples of FIGS. 1-6.

Figure 7:
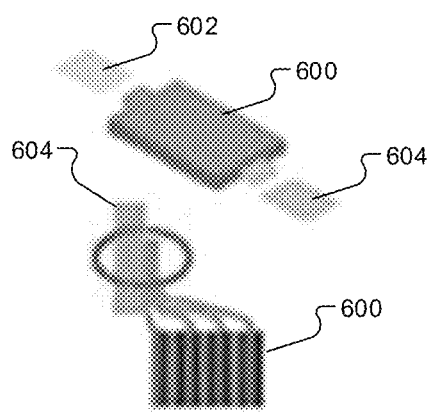
FIG. 7 is a perspective view of an example electrode stack and tabs of a battery cell.

FIG. 7 shows an electrode stack 600 and tabs 602, 604 of a battery cell. The electrode stack 600 include multiple anode electrode layers, cathode electrode layers, and separation layers disposed between the anode electrode layers and the cathode electrode layers. One of the tabs 602, 604 may be connected to the anode electrodes of the electrode stack 600 and the other one of the tabs 602, 604 may be connected to the cathode electrodes of the electrode stack 600.

Figure 8:
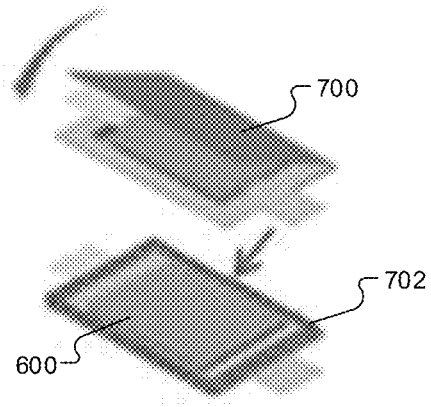
FIG. 8 is a perspective view of an example sealed battery case for the electrode stack of FIG. 7.

FIG. 8 shows a sealed battery case 700 for the electrode stack 600 of FIG. 7 to provide a battery cell. The electrode stack 600 is disposed in the case 700 including upper and lower layers that are sealed along a periphery of the case 700 to form a peripheral seal 702. The peripheral seal extends around a perimeter of the electrode stack 600. The tabs 602, 604 extend from the electrode stack 600 through the peripheral seal and out of the case 700. The battery cell may be configured as any of the battery cells disclosed herein. Although not shown in FIG. 8, the battery cell may include a gas monitoring circuit disposed within or attached to the case 700. Also, although not shown in FIG. 8, the battery cell may include a gas sensor disposed within or attached to the case 700. Gas monitoring circuit and gas sensor arrangements are further described below with respect to FIGS. 11-19.

Figure 9:
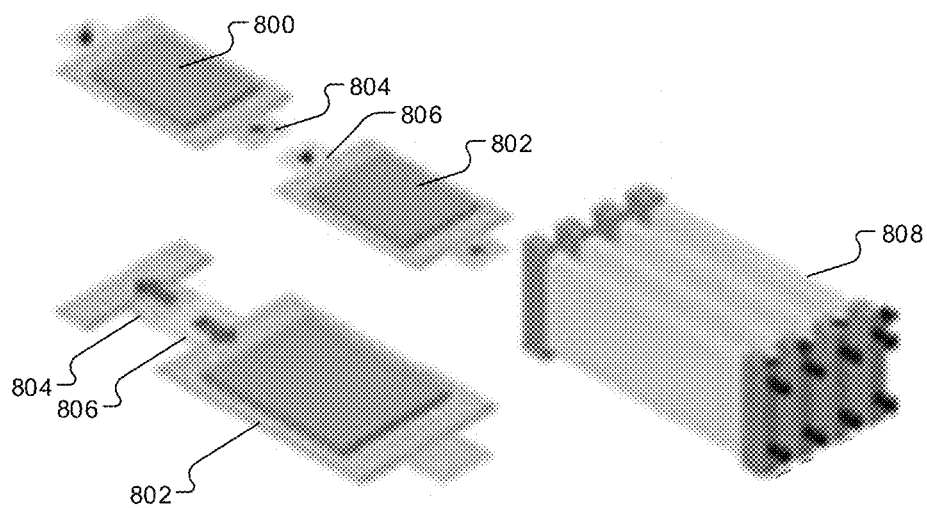
FIG. 9 is a perspective view of serially connected battery cells and corresponding modules (or blocks) of battery cells.
Figure 10:
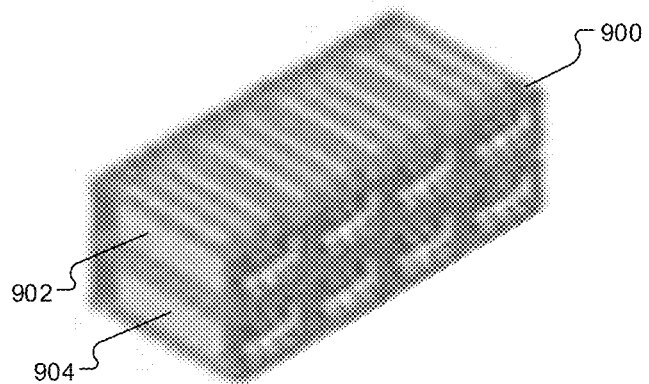
FIG. 10 is a perspective view of a battery pack including modules (or blocks) of battery cells.

FIG. 9 shows serially connected battery cells 800, 802 and corresponding modules (or blocks) of battery cells, such as the battery cell shown in FIG. 8. The opposing tabs (e.g., tabs 804, 806) of the battery cells 800, 802 are connected to provide a chain of battery cells. This is done multiple times to form multiple blocks 808 of battery cells. FIG. 10 shows a battery pack 900 including modules (or blocks) of battery cells (e.g., blocks of battery cells 902, 904). This may include the blocks 808 of FIG. 9.

Figure 11:
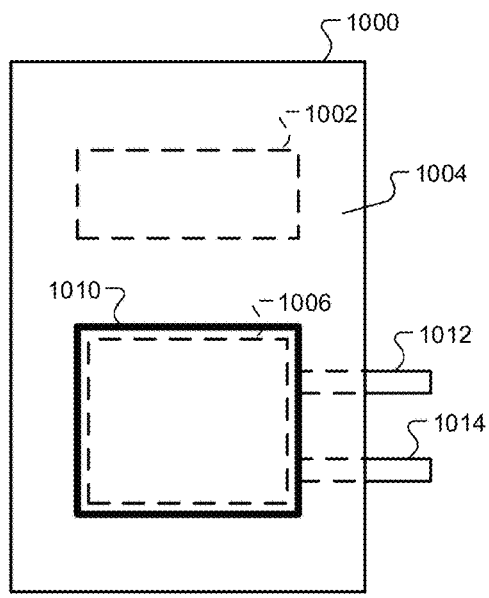
FIG. 11 is a front view of an example battery cell including wireless gas monitoring circuit in accordance with the present disclosure.

FIG. 11 shows an example battery cell 1000 including wireless gas monitoring circuit 1002. The cell 1000 includes a case (or pouch) 1004. The gas monitoring circuit 1002 may be disposed within the case 1004 along with an electrode stack 1006. The battery cell 1000 and other battery cells referred to herein may be in the form of a pouch cell, a prismatic cell, a cylindrical cell, etc. The case 1004 may be under vacuum when sealed such that layers of the case conform to shapes of the gas monitoring circuit 1002 and the electrode stack as shown by box 1010. The electrode stack 1006 includes an anode terminal (or tab) 1012 and a cathode terminal (or tab) 1014.

Figure 15:
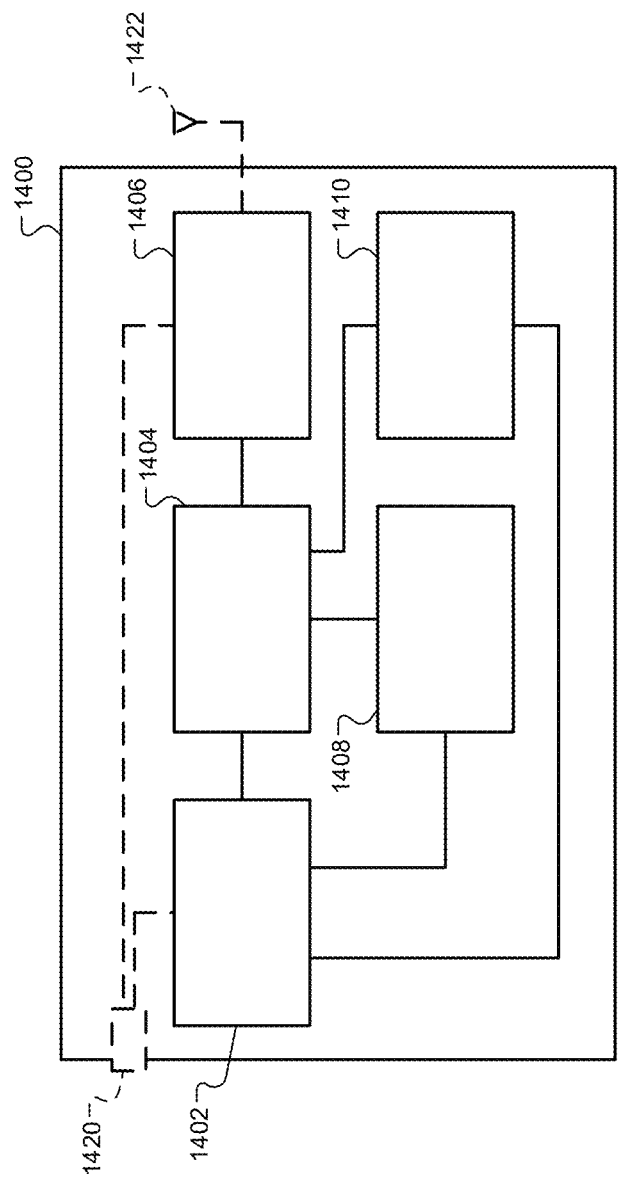
FIG. 15 is a functional block diagram of an example gas monitoring circuit in accordance with the present disclosure.

The gas monitoring circuit 1002 monitors gas levels of one or more gases within the case 1004. The gas monitoring circuit 1002 may include any number of gas sensors. An example of a gas monitoring circuit that may replace the gas monitoring circuit 1002 is shown in FIG. 15. The gas monitoring circuit may wirelessly communicate with any of the ASM modules, BSM modules, and control modules referred to herein. This may include the transfer of sensor data from sensors on the gas monitoring circuit 1002. The gas monitoring circuit 1002 may be powered via a power source external to the gas monitoring circuit 1002 or may include, for example, a rechargeable battery, which may be connected to the gas monitoring circuit 1002. In one embodiment, the gas monitoring circuit 1002 is not powered by the electrode stack 1006. This assures that operation of the gas monitoring circuit 1002 is not affected by power output of the electrode stack 1006.

The gas monitoring circuit 1002 and/or gas sensors, as further described, herein may be fixed to, embedded in and/or removable from the case 1004. The gas monitoring circuit 1002 and the gas sensors may be stand-alone devices outside of the case 1004 or may be attached to and/or included in the case 1004. When fixed, the gas monitoring circuit 1002 and/or sensors may be coated and/or adhered to the case 1004. The gas monitoring circuit 1002 may record sensor data and other data and be removable, such that a direct connection can be made to the gas monitoring circuit 1002 to extract the saved data. The gas monitoring circuit 1002 may be tunable, such that selected sensors are on a given moment in time and for a given operation being performed.

Figure 12:
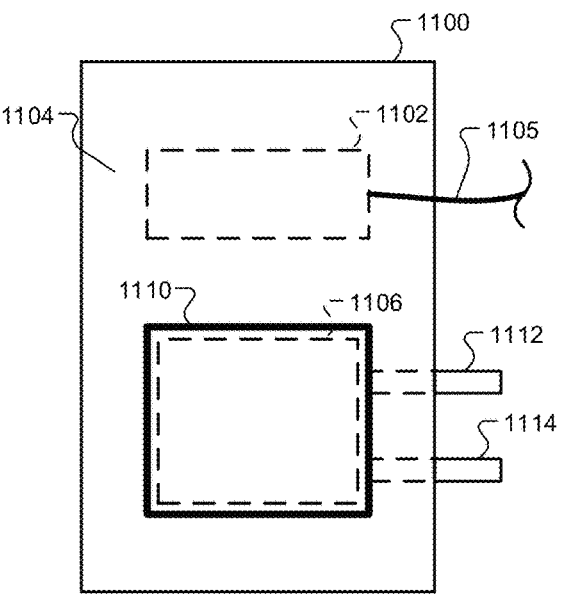
FIG. 12 is a front view of an example battery cell including a wired gas monitoring circuit in accordance with the present disclosure.

FIG. 12 shows a battery cell 1100 including a wired gas monitoring circuit 1102. The cell 1100 includes a case (or pouch) 1104. The gas monitoring circuit 1102 may be disposed within the case 1104 along with an electrode stack 1106. The case 1104 may be under vacuum when sealed such that layers of the case conform to shapes of the gas monitoring circuit 1102 and the electrode stack as shown by box 1110. The electrode stack 1106 includes an anode terminal (or tab) 1112 and a cathode terminal (or tab) 1114.

The gas monitoring circuit 1102 monitors gas levels of one or more gases within the case 1104. The gas monitoring circuit 1102 may be configured similarly as the gas monitoring circuit 1002 of FIG. 11 and may implement wired communication with any of the ASM modules, BSM modules, and control modules referred to herein. This communication may be implemented via a cable 1105 (e.g., a universal serial bus (USB) cable, or other suitable cable and/or set of one or more wires. This may include the transfer of sensor data from sensors on the gas monitoring circuit 1102. The gas monitoring circuit 1102 may be powered via a power source external to the gas monitoring circuit 1002 or may include, for example, a rechargeable battery, which may be connected to the gas monitoring circuit 1102. In one embodiment, the gas monitoring circuit 1102 is not powered by an electrode stack 1106. This assures that operation of the gas monitoring circuit 1102 is not affected by power output of the electrode stack 1106.

Figure 13:
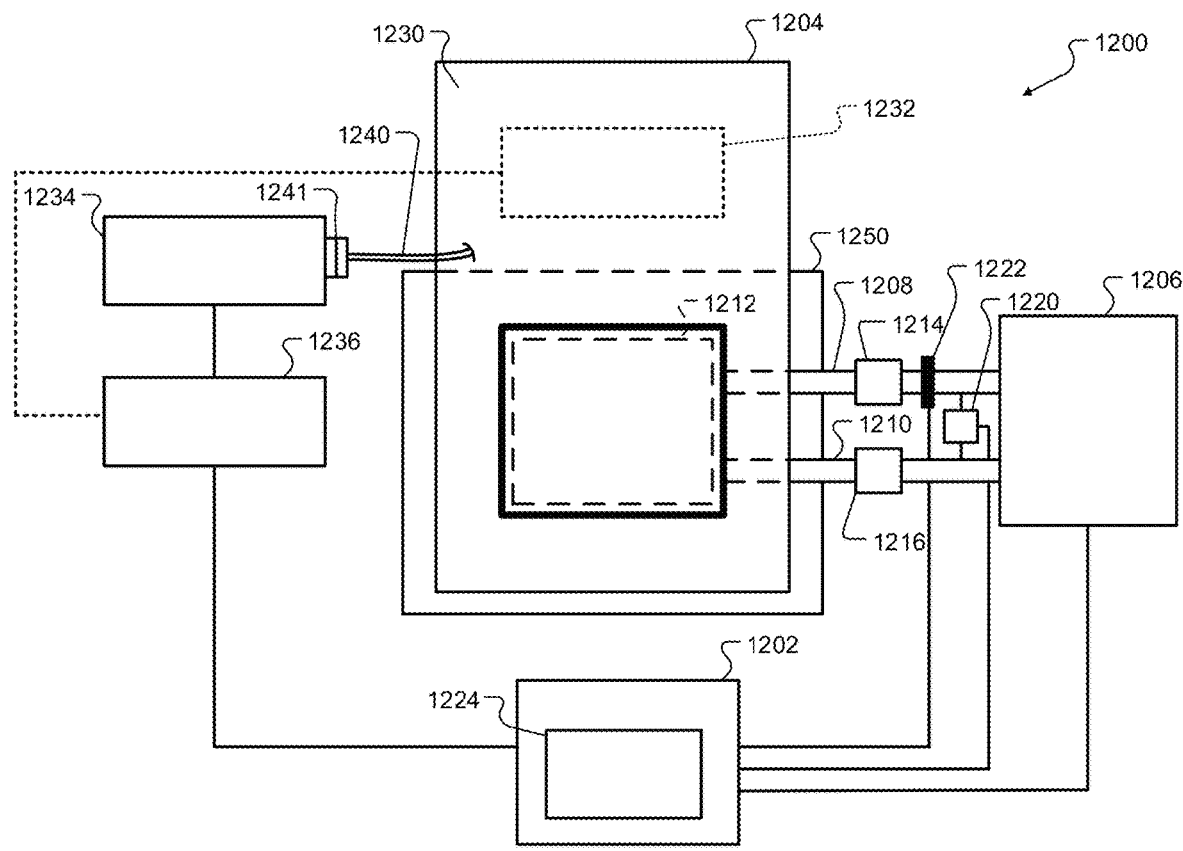
FIG. 13 is functional block diagram of a battery cell monitoring system including a formation monitor in accordance with the present disclosure.

FIG. 13 shows a battery cell monitoring system 1200 including a formation monitor 1202. The formation monitor 1202 may be implemented as a computer and may test and monitor states of a battery cell 1204. The battery cell monitoring system 1200 may further include a cycler 1206 attached to tabs 1208, 1210 of an electrode stack 1212 of the battery cell 1204 via connectors 1214, 1216. A voltage sensor 1220 and a current sensor 1222 may be used to monitor a voltage across the tabs 1208, 1210 and a level of current through the electrode stack 1212. The cycler implements charge and discharge cycles of the electrode stack 1212. This cycling of the electrode stack between charged and discharged states may be controlled and monitored by a control module 1224 of the formation monitor 1202. In one embodiment, the formation monitor 1202 includes the gas monitoring circuit 1236.

The battery cell 1204 may be connected to and/or include one or more sensors. The sensors may be disposed within a case 1230 of the battery cell 1204, as shown by the sensor(s) 1232, or external to the battery cell 1204, as shown by the sensor(s) 1234. Although the gas monitoring circuit 1236 is shown separate from the battery cell 1204 and the sensors, the gas monitoring circuit 1236 may include the sensors and/or be disposed within and/or attached to the battery cell 1204. In one embodiment, the sensor(s) 1234 are connected to the case 1230 via one or more capillaries, an example capillary 1240 is shown. Gas is passed through the capillary and detected by a sensor on the gas monitoring circuit 1236. The sensors 1232, 1234 includes one or more gas sensors. The gas sensors 1234 and/or the capillary 1240 may be connected to the case 1230 via a connector 1241 (e.g., a quick disconnect connector). The gas monitoring circuit 1236 may be configured the same or similarly as any of the other gas monitoring circuits disclosed herein. In one embodiment, sensors are provided such that the control module 1224 is able to monitor the parameters monitored by the BMS module of FIG. 23.

Although the sensors 1234 and the gas monitoring circuit 1236 are shown separate from the case 1230 for a formation process, this arrangement may also be used for other battery cell implementations, such as in a MODACS. The sensors 1234 may be directly connected to the case 1230 without use of a capillary. See, for example, FIG. 18.

The battery cell 1204 may be held at least partially in a fixture 1250. The fixture 1250 may include opposing plates that are used to apply pressure on the battery cell 1204 and the electrode stack 1212. As an example, the plates may be fastened to each other via fasteners, which may be torqued down to apply pressure on the electrode stack 1212. Pressure may be applied to assure that the electrode stack 1212 is performing appropriately. Different pressures may be applied for different electrode stack chemistries. The pressures applied may be the same as pressures applied when implemented in a battery pack and/or in a MODACS.

The control module 1224 and/or the gas monitoring circuit 1236 may detect when an error or issue exists based on gas levels detected via the sensors 1232, 1234 and/or outputs of the sensors 1220, 1222. The stated sensors 1220, 1222, 1232, 1234, are monitored during formation, checking and/or testing of the battery cell 1204. The monitored information may also be used to provide sensor-assisted control of the formation process including modifying a formation protocol. As an example, a gas signal from one of the gas sensors may be monitored and be indicative of cell formation operation completion and/or cell formation completion. In response, the control module 1224 may end a formation operation and/or operations to avoid any excess time spent during formation. As a result, a fixed time protocol is not used and the duration of formation is reduced. This decrease an overall formation process time.

Gas levels may be monitored for quality control and battery safety reasons. When an issue is detected, the control module 1224 may trigger an alarm and cease charging the electrode stack 1212 if operating in a charging mode. This prevents overcharging the electrode stack 1212. As an example, when an amount (or gas level) of $CO_2$ is greater than a set threshold, then overcharging may be occurring. As another example, when a gas level exceeds a predetermined threshold, the potential of a thermal runaway event increases. Thus, to prevent a thermal runaway condition, charging of the electrode stack 1212 may be ceased. Gas formation is based on chemistries of electrodes and surrounding materials and operations being performed.

Figure 14:
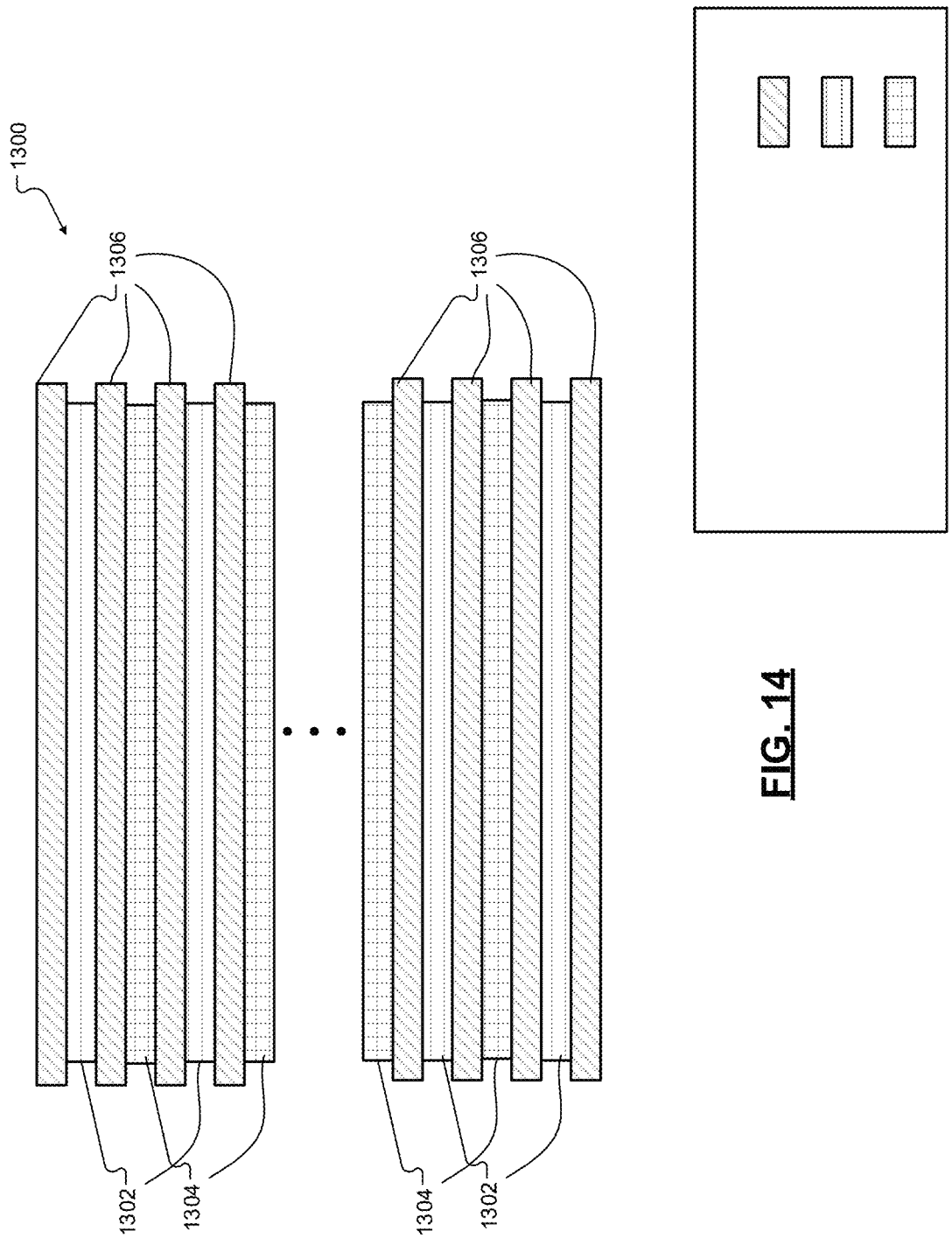
FIG. 14 is an example electrode stack in accordance with the present disclosure.

FIG. 14 shows an electrode stack 1300 that includes anode current collector layers (or anode electrodes) 1302, cathode current collector layers (or cathode electrodes) 1304 and separator layers 1306. The electrode stack 1300 is provided as an example of the other electrode stacks disclosed herein.

The anode electrodes 1302 may be formed of graphite, silicon (Si), silicon oxide ($SiO_x$), a lithium metal material, etc. and combinations thereof. The cathode electrodes 1304 may be formed of nickel manganese cobalt (NMC), nickel cobalt aluminum LiNixCoyAlzO2 NCA, nickel cobalt manganese aluminum (NCMA), lithium manganese oxide LiMn2O4 LMO, lithium manganese nickel oxide (LMNO), lithium cobaltate LiCoO2 (LCO), lithium iron phosphate LiFePO4 (LFP), lithium manganese iron phosphates (LMFP), LLC, etc. The separator layers include one or more electrolytes, such as a carbonate based electrolyte, a fluorinated electrolyte and/or other suitable electrolyte.

FIG. 15 shows an example gas monitoring circuit 1400 that may include a power source 1402, a control module 1404, a transceiver 1406 a memory 1408 and one or more gas sensors 1410. Although not shown in FIG. 15, other sensors, such as voltage and/or current sensors may be included for monitoring voltage across terminals of an electrode stack and/or current through the electrode stack. The memory 1408 provides on-site storage and stores the data collected from the sensors and/or data generated based on the data collected from the sensors.

The power source 1402 may include a battery, one or more capacitors, and/or power source terminals. In one embodiment, the power source 1402 receives power from a remote power source via the connector 1420 and does not include a battery.

The control module 1404, based on outputs of the sensors may determine gas levels within a cell, voltages across terminals of the cell, current levels through an electrode stack of the cell, and/or resistances (e.g., a direct current resistance) of the electrode stack. As an example, the gas monitoring circuit 1400 may include a connector for wired communication and/or to receive power. The connector 1420 may be a USB connector. In an embodiment, the gas monitoring circuit 1400 wirelessly communicates with an ASM module, a BSM module, a control module, a central monitoring station, a formation monitor (e.g., the formation monitor 1202 of FIG. 13), or other monitoring module or device. This communication may include sharing of the data stored in the memory 1408.

The transceiver 1406 may be a wired or wireless transceiver and have an antenna 1422. The transceiver may be configured to communicate with various network devices, such as the transceivers 523 of FIG. 5, the formation monitor 1202 of FIG. 13, a remotely located monitoring device at a central station, and/or other network devices. As an example, the transceiver may operate according Bluetooth® communication protocols. In one embodiment, the transceiver 1406 may wirelessly communicates with one of the transceivers 523 of FIG. 6. In one embodiment, each battery cell within the MODACs 502 of FIG. 6 includes a gas monitoring circuit that is implemented the same or similarly as the gas monitoring circuit 1400 of FIG. 15.

Figure 16:
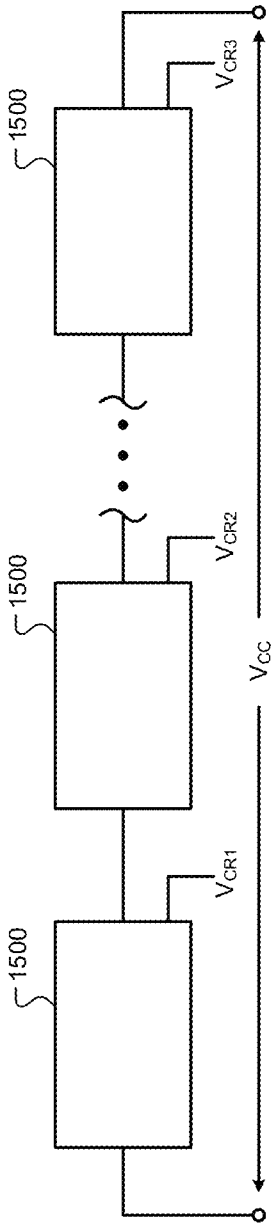
FIG. 16 is a functional block diagram of serially connected gas sensors of a battery cell in accordance with the present disclosure.

FIG. 16 shows serially connected gas sensors 1500 of a battery cell, such as one of the battery cells of FIGS. 7-13. The gas sensors 1500 are connected in series, such that when power having a voltage $V_{CC}$ is supplied to one of the gas sensors 1500, power is supplied to all of the gas sensors 1500. As an example, the gas sensors 1410 of FIG. 15 may include the gas sensors 1500 and the control module 1404 may control the powering of the gas sensors 1500. The control module 1404 may monitor changes in output voltages $V_{CR1}$, $V_{CR2}$, $V_{CR3}$ of the sensors 1500, which may be based on chemical resistance changes of materials of the gas sensors 1500. As an example, the gas sensors 1500 may include chemical resistors for single or multiple gas detection by each of the sensors 1500.

Figure 17:
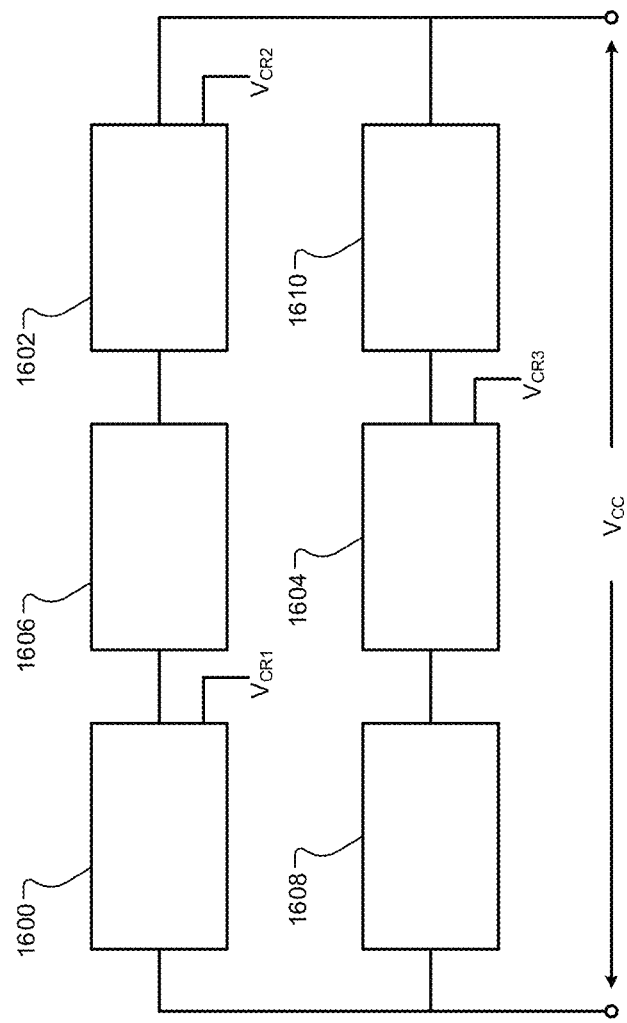
FIG. 17 is an example of parallel and serially connected gas sensors of a battery cell including tuning switches in accordance with the present disclosure.

FIG. 17 shows parallel and serially connected gas sensors 1600, 1602, 1604 of a battery cell including tuning switches 1606, 1608, 1610. In an embodiment, the switches 1606, 1608, 1610 are implemented as transistors, which may be part of one of the gas monitoring circuits disclosed herein or connected separate from the corresponding gas monitoring circuit.

In this arrangement, the gas sensors 1600, 1602 may be powered alone or in combination with the gas sensor 1604. Similarly, the gas sensors 1604 may be powered alone or in combination with the gas sensors 1600, 1602. As an example, the gas sensors 1410 of FIG. 15 may include the gas sensors 1600, 1602, 1604 and the control module 1404 may control the state of the switches 1606, 1608, 1610 to control the powering of the gas sensors 1600, 1602, 1604. A voltage $V_{CC}$ may be supplied to one or more of the gas sensors 1600, 1602, 1604. In one embodiment, one of the switches 1608, 1610 is not included. The outputs of the sensors 1600, 1602, 1604 is represented as $V_{CR1}$, $V_{CR2}$, $V_{CR3}$, which may be based on chemical resistance changes of materials of the gas sensors 1600, 1602, 1604. The ability to select which gas sensor is active provides tunability via the switches 1606, 1608, 1610 and flexibility in the use of certain sensors during certain periods of time and/or under certain operating conditions. This also minimizes power consumed by the sensors. As an example, the gas sensors 1600, 1602, 1604 may include chemical resistors for single or multiple gas detection by each of the sensors 1600, 1602, 1604. Although three gas sensors and three switches are shown, any number of gas sensors and switches may be included and arranged in various serial and parallel arrangements.

Figure 18:
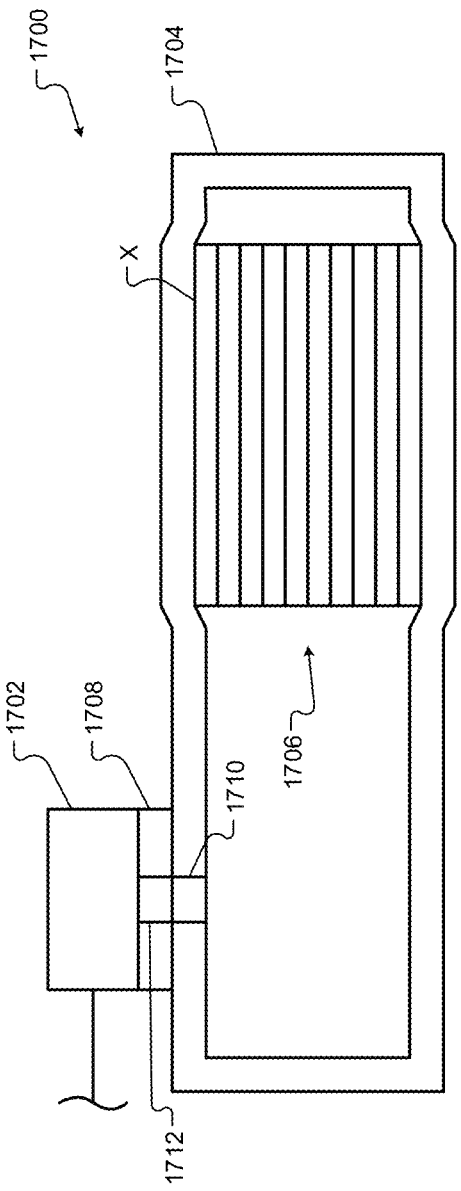
FIG. 18 is a side view of a battery cell including an adhered gas sensor in accordance with the present disclosure.

Gas sensors and/or the gas monitoring circuits may be placed in or near battery cells to detect and monitor gas levels. FIG. 18 shows a battery cell 1700 including a gas sensor 1702. The battery cell 1700 includes a case 1704 that is vacuum fit over an electrode stack 1706. The gas sensor 1702 is adhered to the case 1704 via an adhesive layer 1708. A hole 1710 exists in the case 1704 that allows gas within the case 1704 to be detected by the gas sensor 1702. The hole 1710 is aligned with a channel 1712 in the adhesive layer 1708. The gas sensor 1702 may be connected to a gas monitoring circuit disclosed herein.

Figure 19:
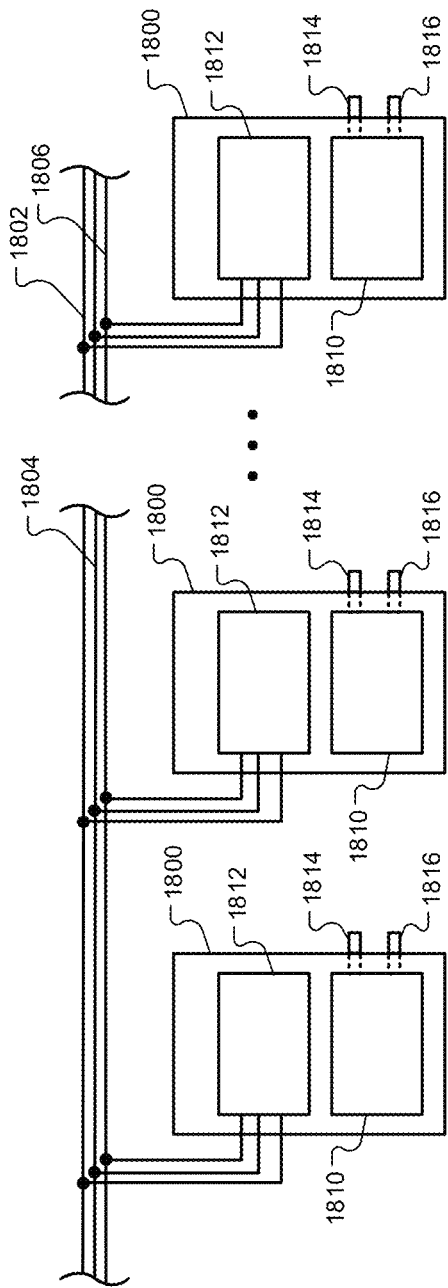
FIG. 19 is a functional block diagram of battery cells connected to communication and power bus bars in accordance with the present disclosure.

FIG. 19 shows battery cells 1800 connected to a communication bus bar 1802 and power bus bars 1804, 1806. The power bus bar 1804 may provide a supply voltage and the power bus bar 1806 may be at a ground reference voltage. Each of the battery cells 1800 include respective electrode stacks 1810 and gas monitoring circuits 1812. The electrode stacks 1810 include terminals 1814, 1816.

In one embodiment, the MODACS control module 503, the ASM module 241 and/or the vehicle control module 504 of FIG. 6 may monitor gas levels and other parameters of battery cells of the MODACS 502, which may include the battery cells 1800. In one embodiment, these parameters are monitored and outliers are flagged and may be isolated and/or further evaluated. As an example, when a gas level of one of the battery cells (an outlier) is significantly higher than gas levels of the other battery cells, then an issue may exist with the outlier.

Figure 20:
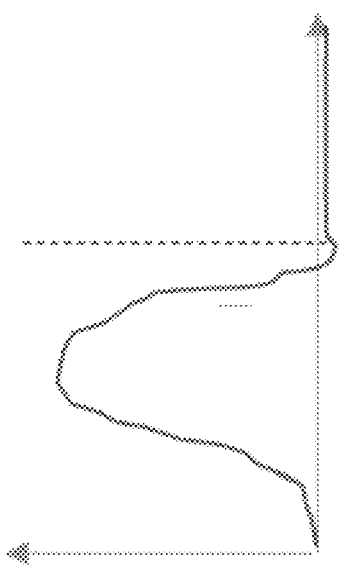
FIG. 20 is an example gas level versus time plot during battery cell formation and in accordance with the present disclosure.

FIG. 20 shows a gas level versus time plot during battery cell formation. The plot is an example of the increase in a gas level within a battery cell during formation of the battery cell. During formation of the battery cell an anode electrode and a cathode electrode may be soaked in an electrolyte material. A formation protocol may include allowing the cathode electrode to stabilize to form a passivated layer. During degassing a lot of gas can be generated. Subsequent to degassing, the electrodes are in a stable state. An example formation method is described with respect to FIG. 25.

Figure 21:
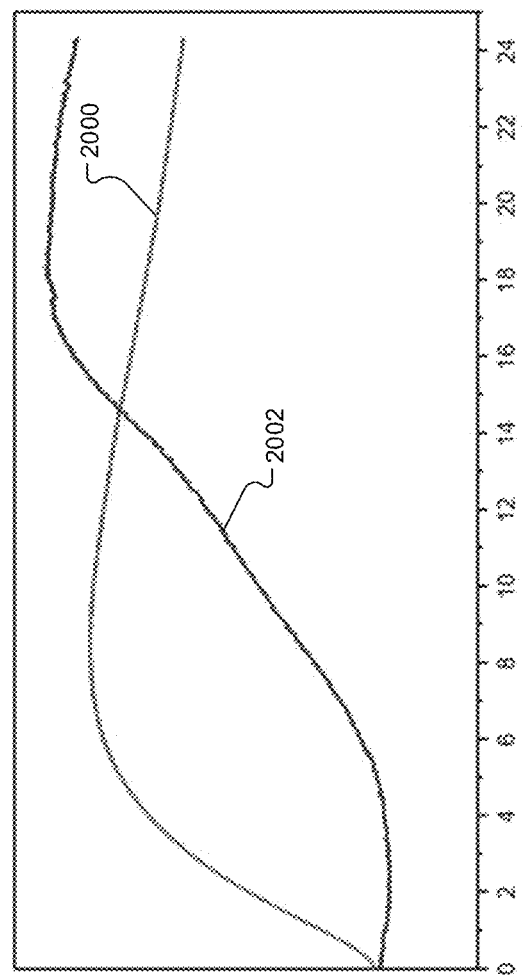
FIG. 21 is an example sensor voltage versus time plot for two different gases in accordance with the present disclosure.

FIG. 21 shows sensor voltage versus time plot for two different gases. A first voltage signal 2000 is shown for a first gas sensor and a second voltage signal 2002 is shown for a second gas sensor.

Figure 22:
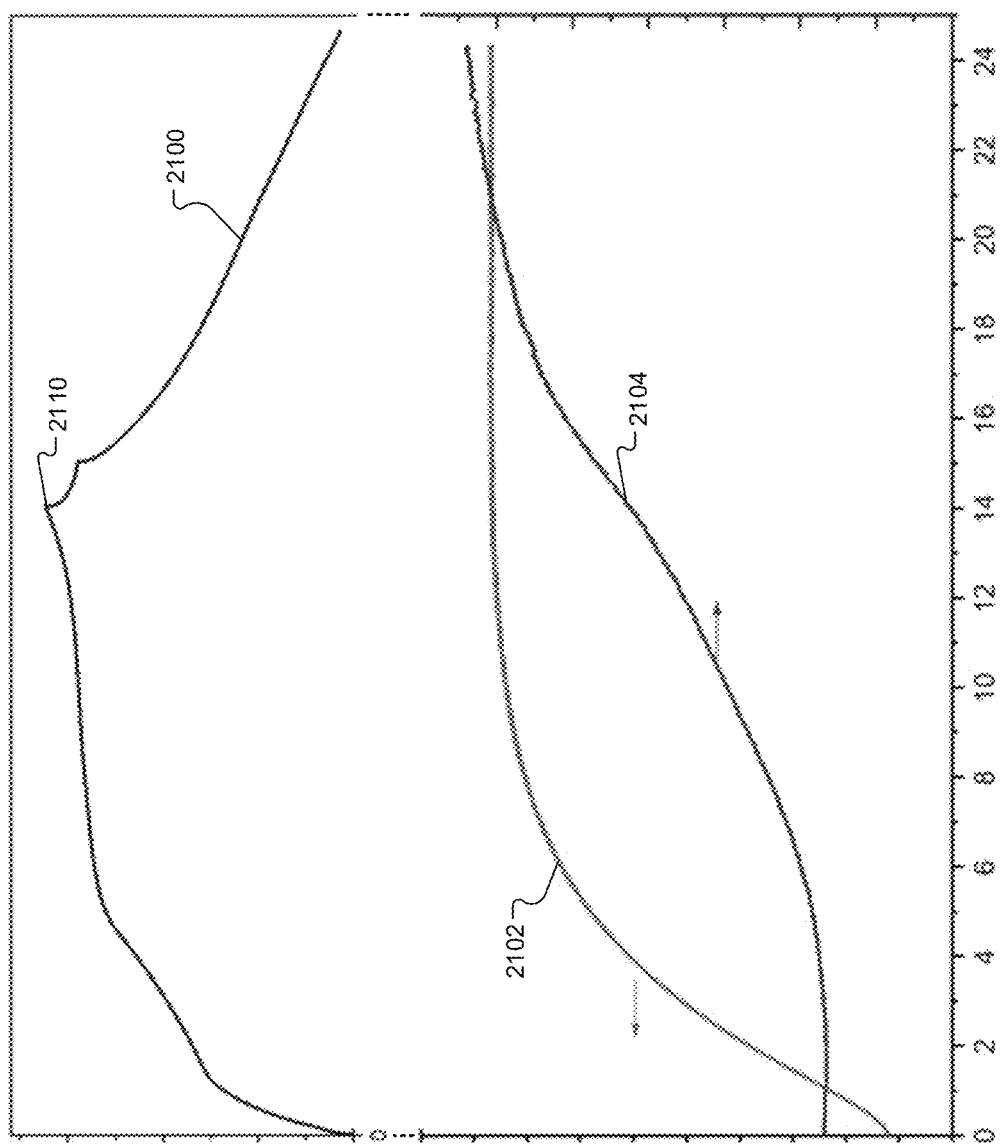
FIG. 22 includes an example plot of battery cell voltage versus time and an example plot of ion current versus time during battery cell formation and in accordance with the present disclosure.

FIG. 22 shows plots of battery cell voltage versus time and ion current versus time during battery cell formation. A voltage signal 2100 of an electrode stack of a cell, a first ion current signal 2102 of a first gas sensor, and a second ion current signal 2104 of a second gas sensor are shown. As an example, the electrode stack may be fully charged when the voltage signal of the electrode stack is at a peak (or maximum voltage). An example peak 2110 is shown.

The plots of FIGS. 21 and 22 are example plots generated during formation of a battery cell. Other gas sensor plots may be generated. Each of the plots and/or one or more sets of the plots may be used to determine whether certain issues and/or conditions exist. Some of these issues and conditions are mentioned above. During formation, when certain cell voltage, gas levels, and/or ion current levels are reached, certain formation steps may be completed. In response to determining that the operations are completed, time spent performing the operations may be decreased by moving on to the next operations and instead of spending any further time performing the previous operations. As another example, when gas levels and/or ion current levels of multiple different gases are at predetermined levels, the battery cell is fully charged. As yet another example, the type and amount of gas generated may indicate whether a thermal runaway is occurring. Example types of gases that may be monitored are stated above.

The ASM systems referred to herein actively monitoring cells and instantaneously and/or quickly disconnect, isolate, and/or reevaluate conditions of the cells. The safety fault may be due to an internal short, an overcharging of cells, and/or other safety fault conditions. When a 12V block safety fault (or suspicious) signal (e.g., an over temperature signal, an abnormal rate of change in voltage signal, an abnormal increase an gas pressure, an abnormal rate of change in temperature signal, and/or other irregularity signal) is generated and diagnosed, the ASM system adjusts a working mode of the suspicious block of cells and/or working modes of one or more other blocks of cells. The actions may include disconnecting and/or isolating the suspicious block of cells. In one embodiment, a block of cells may be isolated when a cell of the block of cells is experiencing an issue.

FIG. 23 shows an example battery monitoring (or management) system (BMS) module 2200 for a block of cells 2202 including any number of cells and/or blocks. In one embodiment, the battery monitoring system module 2200 is provided for each block of cells as part of an ASM system. In the example shown, the BMS module 2200 monitors voltages, temperatures, gas levels, power levels, and current levels of the corresponding block of cells 2202 and determines certain parameters. The BMS module 2200 may include, be connected to, and/or communicate with one or more gas monitoring circuits (one gas monitoring circuit 2203 is shown) for monitoring gas levels within one or more cells. The gas monitoring circuits may be configured similarly and/or perform similar operations as other gas monitoring circuits disclosed herein. In one embodiment, the BMS module is in communication with multiple gas monitoring circuit, which are located in respective cells. In another embodiment, the BMS module is connected to one or more gas sensors (one gas sensor 2205 is shown). The gas sensors may be connected to or included in one or more cells.

The parameters may include instantaneous charge and discharge power and current limits, short term charge and discharge power and current limits, gas level limits and/or thresholds, and continuous charge and discharge power and current limits. The parameters may also include minimum and maximum voltages, minimum and maximum operating temperatures, and SOX limits and/or values. The parameters output by the BMS module 2200 may be determined based on the voltages, temperatures and/or current levels monitored. The charge and discharge power and current capability of a 12V block or pack is affected by the minimum and maximum voltages, minimum and maximum operating temperatures, and SOX limits and/or values of the corresponding cells. The BMS module 2200 may monitor individual cell voltages, temperatures gas levels, and current levels and determine based on this information the stated parameters. The parameters output by the BMS module 2200 are shown as arrow out of the BMS module 2200. The parameters received by the BMS module 2200 are shown as arrow directed to the BMS module 2200. The BMS module 2200 may generate safety fault signals when certain safety fault conditions are detected, such as the safety fault conditions referred to herein.

As an example, the BMS module 2200 may include and/or be connected to sensors, such as a current sensor 2204, the gas sensors and a temperature sensor 2206, which may be used to detect current levels through the cells of block or pack 2202, gas levels of gases in cells, and temperatures of the block or pack 2202. As an example, a voltage across the block or pack may be detected as shown. In an embodiment, one or more voltage sensors may be included to detect voltages of the block of cells 2202. The current sensor 2204 may be connected, for example, between the block of cells 2202 and a source terminal 2208, which may be connected to a load 2210. The temperatures, gas levels, voltages, and current levels are reported to the BMS module 2200 and/or the ASM module 241 (shown in FIGS. 3-6 and 24) as some of the parameters received by the BMS module 2200.

FIG. 24 shows a portion of a MODACS circuit 2300 that includes one or more source terminals. The MODACS circuit 2300 may include multi-functional solid-state switches, switch drive circuits, current and voltage sense circuits arranged in a minimum switch count topology to enable on-demand capacity allocation for source terminals having similar or dissimilar preset (or target) voltages. The MODACS circuit 2300 is flexible, modular, and has minimum size, complexity, weight, and component count. For at least these reasons, the MODACS circuit 2300 minimizes manufacturing difficulty.

As shown, the MODACS circuit 2300 includes block sets, where each block set includes 4 cells, 4 or more switches, a BMS module and source terminals with corresponding power rails. The BMS module may be configured as the BMS module 2200 of FIG. 23. The BMS module may be in communication with and/or connected to gas monitoring circuits and/or gas sensors, as described herein. An example block set 2302 is outlined and includes a block of cells 2304, 4 switches 2306 and a BMS module 2308. The blocks are shown with battery symbols. Three of the switches 2306 connect the blocks 2304 respectively to source terminals (e.g., a 48V, 12VA, and a 12VB source terminals are shown). The fourth one of the 4 switches 2306 connects the block 2304 to a ground reference (or negative terminal) 2312. In an embodiment, the gas monitoring circuit of the BMS module monitors gas levels of the cells of the corresponding block of cells (or block set).

As shown the blocks may be arranged in an array having rows and columns. Each of the blocks may be configured the same except one of the rows closest to the ground reference. In this row, each of the blocks includes three switches instead of four switches. As a result, the corresponding cells are connected to the ground reference without use of switches, as shown.

As can be seen, the blocks may be connected to each of the source terminals. Any block may be connected to any one or more of the source terminals. The first switches in the block sets in one of the rows (or first row) may be connected to the first source terminal (48V source terminal). The first switches in the block sets in one or more intermediate rows (e.g., the second and third rows) may be connected to cell(s) in a previous row. This allows the cell(s) in the blocks in each column to be connected in series. Under certain conditions, the blocks in columns are connected in series to form two or more series of blocks and the multiple series of blocks are connected in parallel to maximize power to the first source terminal.

The MODACS circuit 2300 further includes a MODACS control module 240 that controls states of the blocks and includes the ASM module 241. The MODACS control module 240 receives BMS signals from the BMS modules and a system capacity request signal from a vehicle control module or non-vehicular control module (a control module of a device other than a vehicle). Based on priorities of the voltage source terminals, parameters, and power and current demands indicated by the system capacity request signal, the MODACS control module 240 determines a connected configuration and sets states of the switches of the cells and/or blocks. Additional switches than shown may be included for more selective isolation of cells. The parameters may include voltages, power levels, current levels, gas levels, and temperatures indicated in the BMS signals. The MODACS control module 240 generates an actual capacity allocation signal indicating capacity allocation for the source terminals. The actual capacity allocation may not match the requested capacity allocation depending on: the state of the MODACS including whether there is any faults or shorts; and the SOH of the blocks. The actual capacity allocation signal may be transmitted from the MODACS control module 240 to the vehicle control module or non-vehicular control module.

The MODACS circuit 2300 includes a 12V switching matrix, architecture, and switch controls to enable elimination of 12V stabilization using a DC-to-DC converter, such as a 48V to 12V DC-to-DC buck or boost converter, and/or elimination of 12V and/or 48V redundant back-up power. The MODACS circuit 2300 has a minimal circuit, block, switch configuration for one high power, high voltage (e.g., V1 greater than or equal to 24V) source terminal and at least two low power, low voltage (e.g., two 12V) source terminals. The switches may be solid-state switches for fast noise free reconfiguring. The switches may be configured for bi-directional voltage and current blocking capability to prevent shorts between high and low voltage source terminals. Switches configured for unidirectional voltage and current blocking may be used to minimize losses selectively.

The switches may be implemented in a single chip or in a multi-chip package. The switches may include enhancement mode silicon metal-oxide-semiconductor field-effect-transistors (MOSFETs), gallium nitride (GaN) FETs, silicon carbide (SiC) MOSFETS, insulated-gate bipolar transistors (IGBTs), and/or other suitable switches. The switches may be in an ON state, an OFF state, or a linear operating state for impedance matching purposes. The switches may be integrated together with drivers and interlock logic to prevent short circuits between blocks, between different source terminals, and between a source terminal and a ground reference. The switches are controlled to achieve a desired capacity at each source terminal based on control module demands and status updates in the form of feedback signals from the BMS modules of the blocks.

In an embodiment, the cells of the blocks are lithium battery cells, but may be other types of cells. The example of FIG. 24 is shown to illustrate a minimalistic architecture having a minimal number of blocks and switches per block set to provide 48V, 12VA and 12VB outputs without a DC-to-DC converter.

Figure 25A:
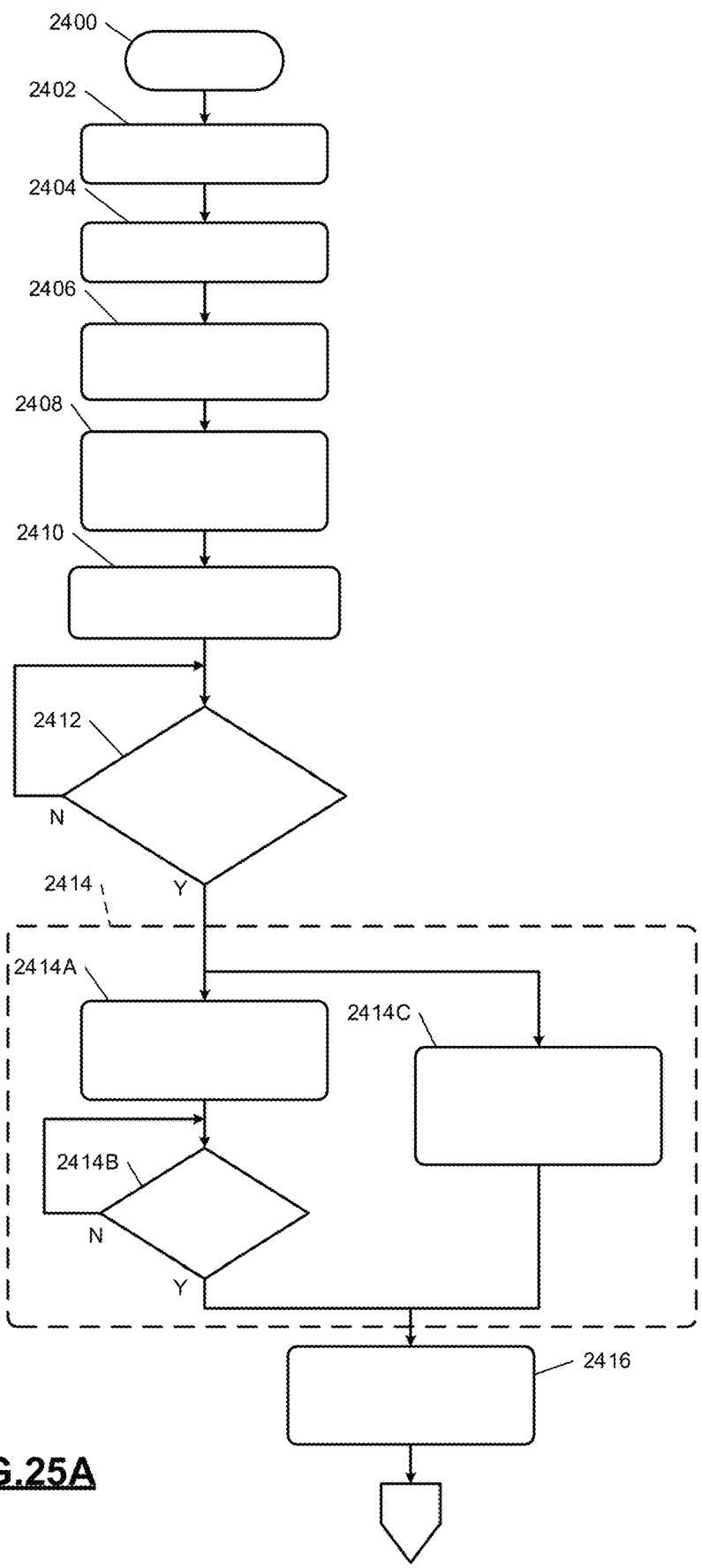
FIGS. 25A-C illustrates a battery cell formation method in accordance with the present disclosure.
Figure 25B:
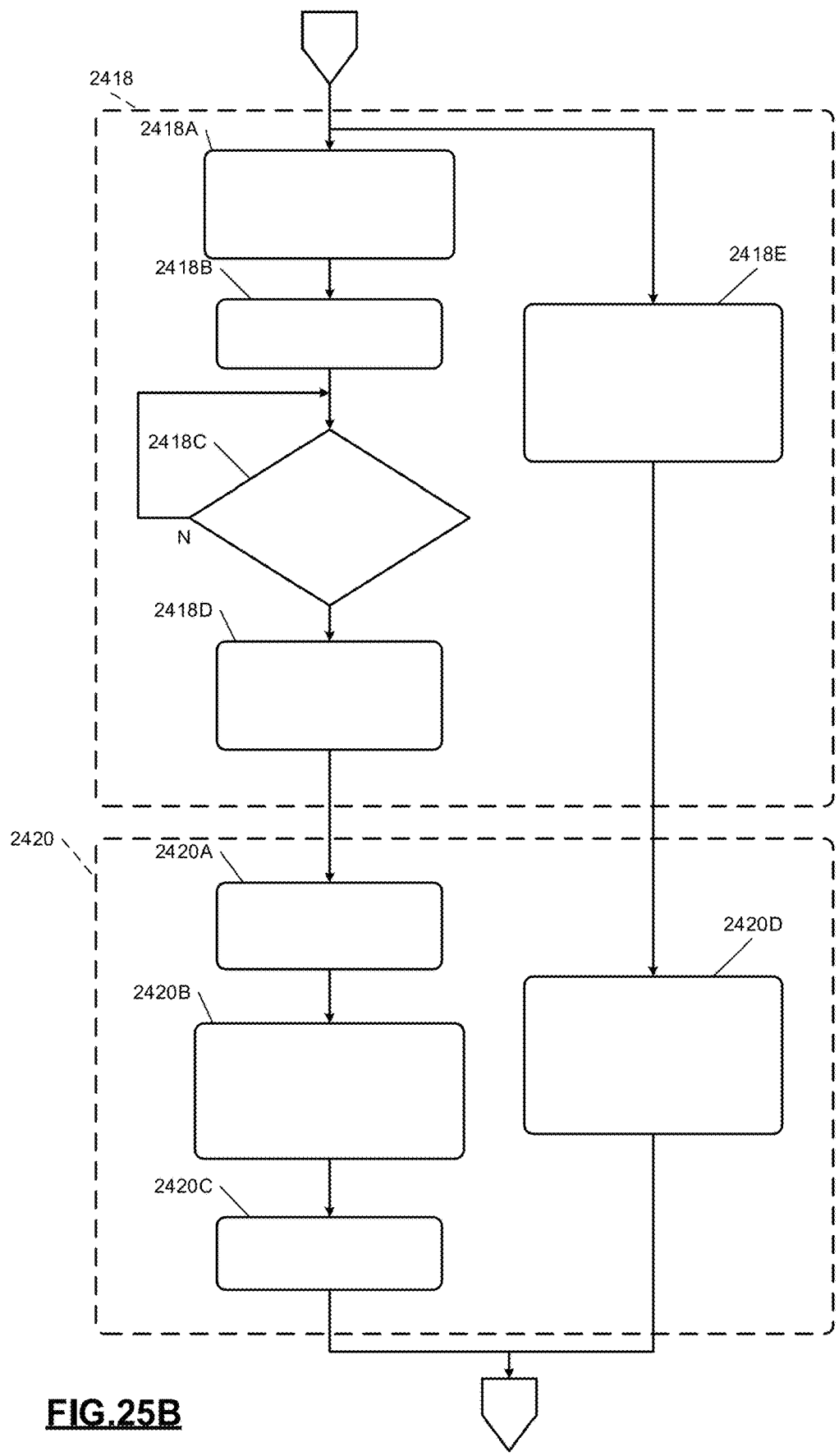
Figure 25C:
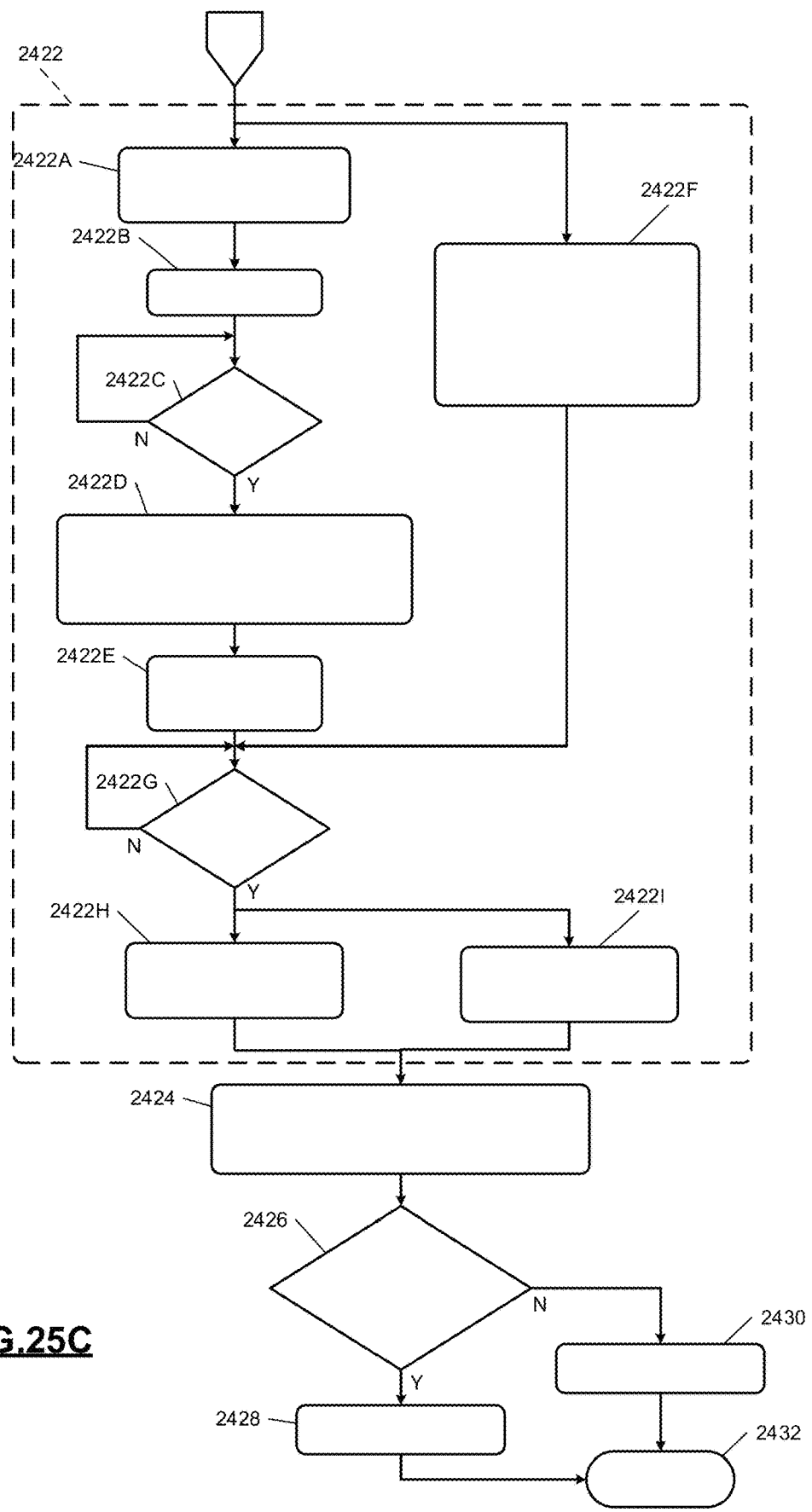

FIGS. 25A-C illustrates a battery cell formation method. Although the method of FIG. 25 is described with respect to a single battery cell, the method may be performed for multiple battery cells in parallel. This method may be automated and performed using one or one or more robots, which may be controlled by the control module 1224 of FIG. 13.

The method may begin at 2400. At 2402, a battery cell is assembled. At 2404, the battery cell is placed in a fixture (e.g., the fixture 1250 of FIG. 13). At 2406, pressure (e.g., 4-50 pound-force per square inch (psi)) is applied on an exterior of the battery cell.

At 2408, the battery cell is charged to a first predetermined voltage (e.g., 3.9V) at a constant current I1 (e.g., C/20). A battery cell C rating is the measurement of current in which a battery is charged and discharged. The capacity of a battery (or battery cell) is generally rated and labeled at the 1 C rate (1 C current), which means a fully charged battery (or battery cell) with a capacity of 10 Ampere hours (Ah) should be able to provide 10 Amps for one hour.

At 2410, the first predetermined voltage is maintained and a clock is started. At 2412, the control module 1224 determines whether a current level of the battery cell has decayed to a second current level I2 (e.g., C/100). If yes operation 2414 is performed.

At 2414, degassing of the battery cell is performed. At 2414A, the battery cell is removed from the fixture to begin degassing. At 2414B, the control module 1224 determines whether degassing is complete. If yes, operation 2416 is performed. This may be determined based on one or more gas levels within a case of the battery cell, as described above. At 2414C, the control module 1224 monitors one or more gas levels in a case of the battery cell while performing at least operation 2414.

At 2416, the control module 1224 may cease monitoring the gas levels within the battery cell.

At 2418, the control module 1224 performs a life capacity check of the battery cell. At 2418A, the battery cell is returned to the fixture and charged to a second predetermined voltage (e.g., upper voltage limit Vmax (e.g., 4.2V)) at the constant current I1. At 2418B, the second predetermined voltage is maintained on the battery cell. At 2418C, the control module 1224 determines whether a current level of the battery cell has decayed to the second current level I2. If yes operation 2418D is performed.

At 2418D, the control module 1224 permits the voltage on the battery cell to drop to a third predetermined voltage (e.g., a lower voltage limit Vmin (e.g., 2.5V)) while at the constant current level I1.

At 2418E, the control module 1224 may monitor the previous one or more gas levels and/or another one or more gas levels in the case of the battery cell while performing at least operation 2418.

At 2420, an initial resistance check of the battery cell is performed. At 2420A, the battery cell is charged and discharged at 1 C rate for 2 cycles at a same potential window (e.g., 2.5-4.2V). At 2420B, the control module 1224 performs a third cycle and during discharge and when at 50% of SOC, applies a 3 C pulse and measures the direct current resistance (DCR). At 2420C, the control module 1224 charges at 1 C to 50% of SOC.

At 2420D, the control module 1224 may monitor the previous one or more gas levels and/or another one or more gas levels in the case of the battery cell while performing at least operation 2420.

At 2422, an aging process is performed. At 2422A, the battery cell is placed in a thermal chamber, which is at a set temperature (e.g., 35° C.). At 2422B, a first timer is started. At 2422C, based on the first timer and when the aging period is up, operation 2422D is performed. As an example, the battery cell may remain in the thermal chamber for a week.

At 2422D, the battery cell is removed from the thermal chamber and/or a temperature of the battery cell is permitted to decrease to room temperature. At 2422E, a second timer is started.

At 2422F, the control module 1224 may monitor the previous one or more gas levels and/or another one or more gas levels in the case of the battery cell while performing at least operations 2422A-E.

At 2422G, the control module 1224 may determine whether the second timer is up. As an example, the battery cell may be placed at room temperature for 1 hour. If yes, operation 2422H and 2422I are performed.

At 2422H, the control module 1224 measures parameters of the battery cell including a resistance, a voltage, a temperature and/or levels of gases of the battery cell. At 2422I, the control module ceases monitoring gas levels.

At 2424, the control module 1224 compares voltage, resistance, gas levels, temperature levels, and/or other parameters measured at 2422H and/or throughout the method of FIG. 25 to predetermined ranges for performed operations. At 2426, the control module 1224 determines whether the one or more parameters are outside of predetermined ranges, operation 2428 is performed, otherwise operation 2430 is performed.

At 2428, the battery cell is discarded. At 2430, the battery cell is not discarded and may be included in a battery pack. The method may end at 2432.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A battery cell monitoring system comprising:
    a battery cell comprising an electrode stack disposed within a case;
    a plurality of gas sensors disposed within the case and configured to detect levels of one or more gases within the case;
    a gas monitoring circuit connected to the plurality of gas sensors and comprising
        a memory configured to store data collected from the plurality of gas sensors,
        a transceiver configured to transfer the data to a network device separate from the battery cell, and
        a control module configured to monitor the levels of one or more gases and based on the levels of the one or more gases detect (i) an issue with the battery cell during operative use of the battery cell, (ii) an issue with the battery cell during formation of the battery cell, or (iii) completion of a formation operation of the battery cell; and
    a plurality of switches connected to the plurality of gas sensors,
    wherein
        the plurality of gas sensors are disposed in the battery cell; and
        the control module is configured to control operation of the plurality of switches to activate selected ones of the plurality of gas sensors to monitor the levels of the one or more gases in the case of the battery cell.

2. The battery cell monitoring system of claim 1, wherein the gas monitoring circuit is implemented within the case of the battery cell.

3. The battery cell monitoring system of claim 2, wherein the transceiver is configured to wirelessly communicate with the network device.

4. The battery cell monitoring system of claim 2, wherein the transceiver is configured to communicate with the network device via a wired connection.

5. The battery cell monitoring system of claim 1, wherein the gas monitoring circuit is connected to the case via a capillary.

6. The battery cell monitoring system of claim 1, wherein the gas monitoring circuit receives power via a connector and cable and not from the electrode stack.

7. The battery cell monitoring system of claim 1, wherein the control module is configured to detect an issue with the battery cell based on the levels of the one or more gases and isolate the battery cell from other battery cells within a battery pack.

8. The battery cell monitoring system of claim 1, wherein the plurality of gas sensors are attached to the case of the battery cell.

9. The battery cell monitoring system of claim 1, wherein the plurality of gas sensors comprise parallel connected gas sensors.

10. The battery cell monitoring system of claim 1, wherein the plurality of gas sensors comprise serially and parallel connected gas sensors.

11. An active safety management system comprising:
the battery cell monitoring system of claim 1; and
a plurality of gas monitoring circuits connected respectively to a plurality of cells including the battery cell, wherein the control module is configured to monitor the plurality of gas monitoring circuits and detect an outlier cell of the plurality of cells and isolate the outlier cell.

12. A battery cell monitoring system comprising:
a battery cell comprising an electrode stack disposed within a case;
one or more gas sensors disposed within, attached to or connected to the case and configured to detect levels of one or more gases within the case; and
a gas monitoring circuit connected to the one or more gas sensors and comprising
  a memory configured to store data collected from the one or more gas sensors,
  a transceiver configured to transfer the data to a network device separate from the battery cell, and
  a control module configured to monitor the levels of one or more gases and based on the levels of the one or more gases detect (i) an issue with the battery cell during operative use of the battery cell, (ii) an issue with the battery cell during formation of the battery cell, or (iii) completion of a formation operation of the battery cell,
wherein the control module is configured to
  monitor a voltage of the battery cell,
  ion current levels of a plurality of gases in the case of the battery cell, wherein the plurality of gases includes the one or more gases, and
  detect whether the battery cell is fully charged or has an issue based on the voltage and the ion current levels of the plurality of gases.

13. A formation system comprising:
a battery cell monitoring system comprising
  a battery cell comprising an electrode stack disposed within a case,
  one or more gas sensors disposed within, attached to or connected to the case and configured to detect levels of one or more gases within the case, and
  a gas monitoring circuit connected to the one or more gas sensors and comprising
    a memory configured to store data collected from the one or more gas sensors,
    a transceiver configured to transfer the data to a network device separate from the battery cell, and
    a control module configured to monitor the levels of the one or more gases and based on the levels of the one or more gases detect (i) an issue with the battery cell during operative use of the battery cell, (ii) an issue with the battery cell during formation of the battery cell, or (iii) completion of a formation operation of the battery cell;
a cycler configured to charge and discharge the battery cell; and
a formation monitor configured to control the cycler during formation of the battery cell, communicate with the gas monitoring circuit, and based on the levels of one or more gases, detect an issue with the battery cell or completion of the formation operation of the battery cell.

* * * * *